United States Patent [19]
Potter et al.

[11] Patent Number: 5,650,929
[45] Date of Patent: Jul. 22, 1997

[54] MODULAR ELECTRONIC DISPLAY AND ACCESSORY MOUNTING SYSTEM FOR A VEHICLE

[75] Inventors: Suzanne K. Potter, Streamwood, Ill.; Paul S. VanLente, Holland, Mich.; Joseph W. Strazanac, Holland, Mich.; Michael J. Suman, Holland, Mich.

[73] Assignee: Prince Corporation, Holland, Mich.

[21] Appl. No.: 431,283

[22] Filed: Apr. 28, 1995

[51] Int. Cl.$^6$ .................................................. H01R 33/00
[52] U.S. Cl. ..................... 364/423.098; 340/438; 439/34
[58] Field of Search ............... 364/424.01, 424.05, 364/423.098, 424.045; 340/438; 439/34, 43, 49; 307/10.1

[56] References Cited

U.S. PATENT DOCUMENTS

| | | | |
|---|---|---|---|
| 3,590,136 | 6/1971 | Kunishi et al. | 174/50 |
| 3,635,305 | 1/1972 | Kunishi et al. | 180/90 |
| 4,153,127 | 5/1979 | Klink et al. | 180/60 R |
| 4,689,718 | 8/1987 | Maue et al. | 361/360 |
| 4,824,164 | 4/1989 | Nakayama et al. | 296/146 |
| 4,867,498 | 9/1989 | Delphia et al. | 296/37.7 |
| 4,869,670 | 9/1989 | Ueda et al. | 439/34 |
| 4,953,305 | 9/1990 | Van Lente et al. | 33/356 |
| 4,956,748 | 9/1990 | Yamamoto et al. | 361/394 |
| 5,040,990 | 8/1991 | Suman et al. | 439/34 |
| 5,154,617 | 10/1992 | Suman et al. | 439/34 |
| 5,245,258 | 9/1993 | Becker et al. | 318/266 |
| 5,323,321 | 6/1994 | Smith, Jr. | 364/449 |
| 5,451,822 | 9/1995 | Bechtel et al. | 307/9.1 |
| 5,469,298 | 11/1995 | Suman et al. | 359/630 |
| 5,475,366 | 12/1995 | Van Lente et al. | 340/525 |
| 5,555,172 | 9/1996 | Potter | 364/424.01 |

FOREIGN PATENT DOCUMENTS 63-227441A  9/1988  Japan.

*Primary Examiner*—Michael Zanelli
*Attorney, Agent, or Firm*—Price, Heneveld, Cooper, DeWitt & Litton

[57] ABSTRACT

A modular electronic system for vehicles employing a microprocessor to facilitate the implementation of additional vehicular features embodied in electronic accessory modules. The system includes a housing with separate mounting areas for receiving at least one of a plurality of plug-in electrical modules and one of a plurality of display boards for displaying information relating to associated modules.

33 Claims, 34 Drawing Sheets

MODULAR ELECTRONIC DISPLAY AND ACCESSORY MOUNTING SYSTEM FOR A VEHICLE

BACKGROUND OF THE INVENTION

The present invention relates to a modular electronic system for vehicles and particularly one which facilitates the mounting of a variety of selectable accessory modules and displays for providing a variety of electronic vehicular features.

Electrical circuitry can accessorize a vehicle to provide a wide variety of electronic features such as an electrical compass, the receipt and display of paging messages, navigation information, cellular telephone controls, vehicle operating parameter displays, and the like. To be operational, the electrical circuitry of these features requires connection to the vehicle's electrical system and, in some instances, to remote microprocessors, displays, sensors, and the like. Various combinations of such features may be desired by a vehicle's owner, either at the time of or subsequent to the purchase of a vehicle. Thus, a system that facilitates the selectable implementation of various combinations of such electronic features is desired.

U.S. Pat. No. 5,040,990, issued Aug. 20, 1991 to the present assignee, discloses a system that enables electronic features, embodied in external accessory modules, to be installed within a vehicle either during manufacture or subsequent to purchase. This system provides the flexibility to implement various modules such that a wide range of consumer preferences are accommodated. However, this system requires manual interfacing between the accessory modules and the vehicle's electrical system, and programming to complete the installation.

Thus, there exists a need for an electronic system enabling various electronic features to be easily and conveniently added to a vehicle during manufacture, at the dealer, or subsequent to purchase, and one which has the flexibility to accommodate a wide range of consumer preferences.

SUMMARY OF THE INVENTION

The modular electronic system of the present invention includes a circuit containing a microprocessor and is capable of receiving one or more plug-in electronic accessory modules for implementation of various electronic systems and features. The microprocessor recognizes each module and processes information therefrom and is coupled to at least one of a selective number of display boards for displaying information associated with the additional electronic features provided by such modules. Both the display boards and accessory modules are thus electrically interfaced to each other and to the vehicle's electrical system upon connection to the microprocessor. In a preferred embodiment, a housing is provided with receptacles to facilitate the mounting of said modules.

The present invention thus provides an easy and convenient means by which to implement electronic vehicular features in a vehicle during manufacture, at a dealership, or by the consumer subsequent to purchase. Furthermore, the present invention enables vehicle manufacturers to incorporate a single circuit mounting system within their vehicles which has the flexibility to accommodate a wide range of consumer preferences.

These and other features, objects, and advantages of the present invention will become apparent upon reading the following description thereof together with reference to the accompanying drawings in which:

DETAILED DESCRIPTION OF THE EMBODIMENT

Figure 1:
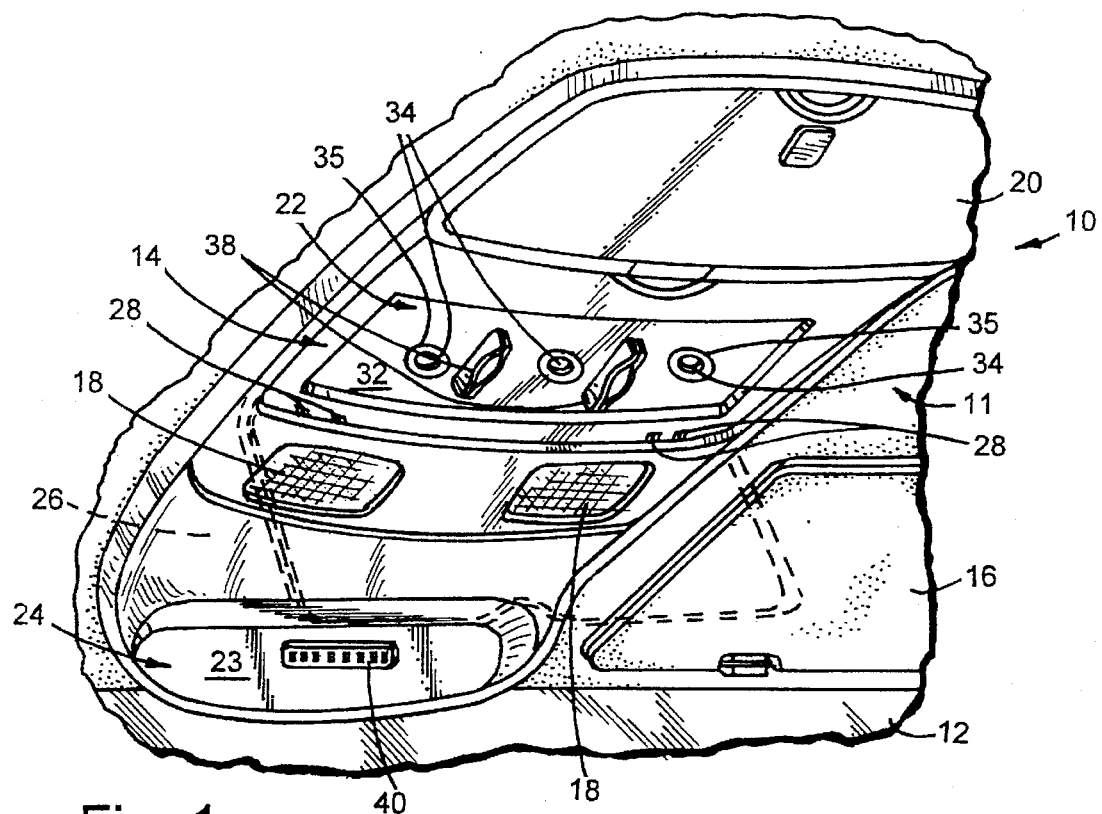
FIG. 1 is a fragmentary perspective view of the interior of a vehicle including an overhead console having a first uncovered recess for receiving electronic accessory modules, and a second recess for receiving display modules.

Referring now to FIG. 1, the front interior area of a vehicle 10 is shown. An overhead console or housing 14 is attached to the roof 11 of the vehicle and, in the preferred embodiment, is positioned between visors 16 adjacent windshield 12. The housing may optionally contain map lights 18 and a covered sun glass storage bin 20. Contained within housing 14 is a first or accessory module mounting area 22 defined by a recessed floor 32. The first mounting area is selectively enclosed by means of a cover 26 (FIG. 2) conventionally mounted by hinges 28 to the frame of the housing to form a first enclosure 30. Cover 26 is shown in FIG. 1 in dashed lines in an open position to allow access to the accessory module mounting area. Floor 32 has a plurality of spaced apertures or receptacles 34 for physically receiving in one embodiment, a number of electrical plug-in modules having a physical characteristic which allows the module to extend through the receptacle in floor 32 and be electrically coupled to a mating connector in a mother circuit board 36 (FIG. 3) mounted above floor 32. Circuit 36 includes a microprocessor 46 which as described below recognizes and communicates with each module mounted within enclosure 30 and provides display signals to a display 42 (FIGS. 2 and 3) mounted to a second forward mounting area 24 of housing 14.

A variety of electronic accessory modules 38 are snapped into receptacles 34, one module per receptacle, such that a plug or socket on the module 38 extends through floor 32 and electrically connects to a mating socket or plug, respectively, aligned on the circuit board on the opposite side of floor 32. The second mounting area 24 of housing or console 14 also defines a recess having a wall 23 which includes an electrical socket 40 which is electrically connected to the circuit board 36 such that a display module or board 42 having control switches 43 can be positioned within mounting area 24 and mechanically connected to socket 40 and also electrically connected to the mother circuit board 36.

Figure 2:
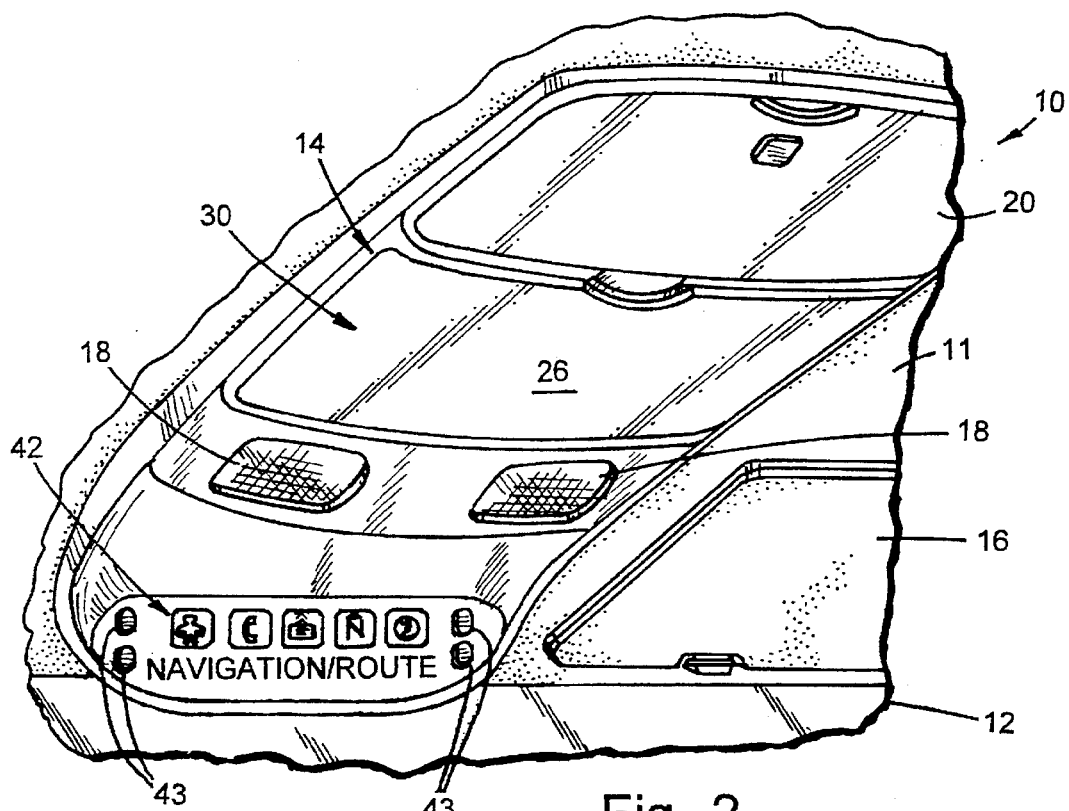
FIG. 2 is a fragmentary perspective view of the interior of the vehicle shown in FIG. 1 but with the first recess enclosed by a cover and a display board mounted within the second recess.

With the system of the present invention, therefore, several different display modules or boards can be plugged into the socket 40 of the forward readily visible display mounting area 24 of console 14 while several different optional electronic modules 38 which interface with the display can be mounted within receptacles 34 in mounting area 22 and subsequently enclosed by cover 26 (FIG. 2). The microprocessor is programmed to recognize and interconnect each electronic accessory module with a selected display and the vehicle's electrical system. Having briefly described the overall mounting arrangement, a detailed description of the system follows.

Figure 3:
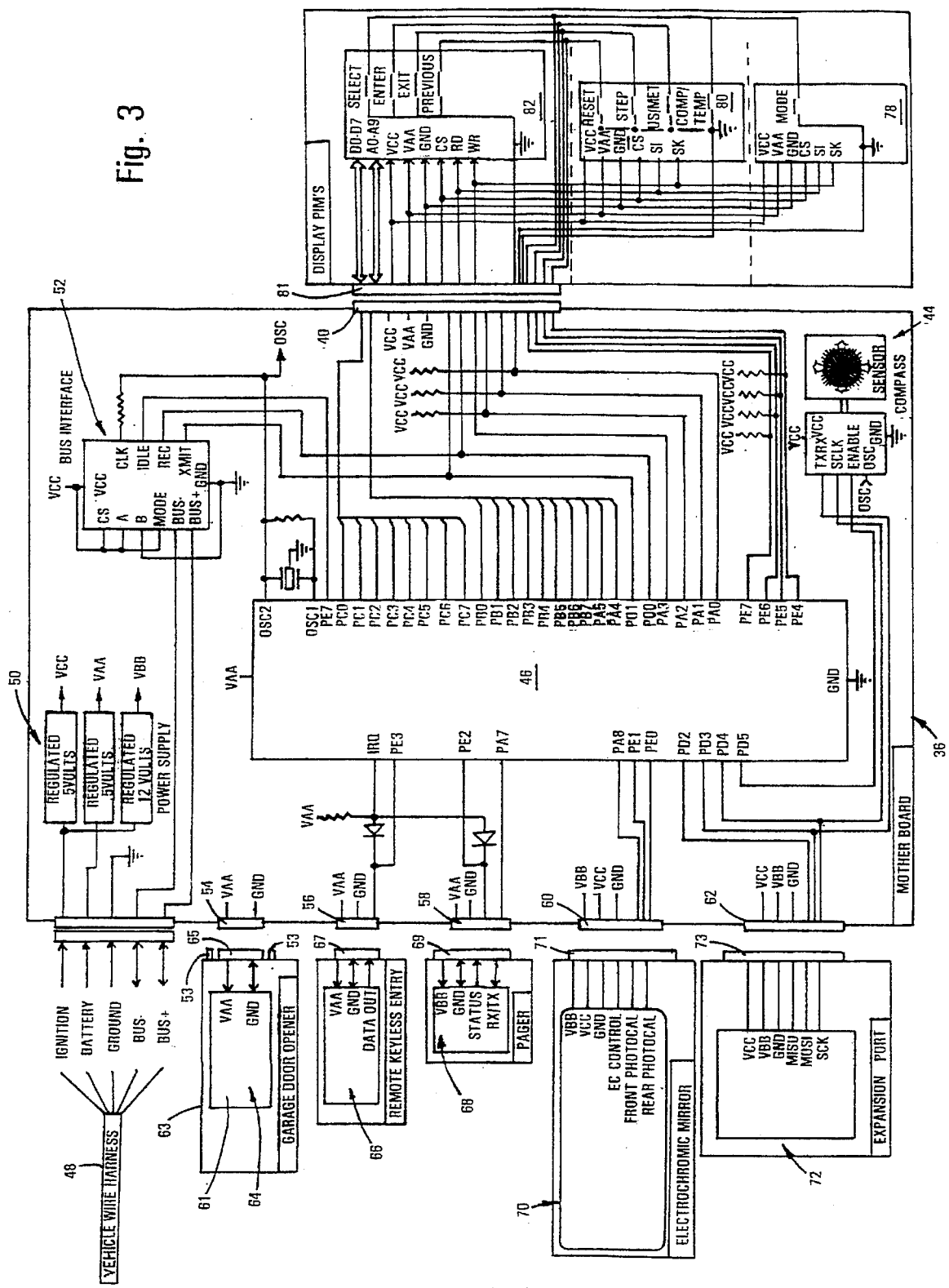
FIG. 3 is an electrical circuit diagram partially in block and schematic form of the electrical circuit of the present invention.

The circuit board and microprocessor located behind floor 32 in housing 14 are connected to the vehicle's electrical system such that the accessory modules and the display board are automatically interfaced with the vehicle upon connection. The details of the connection between the circuit board and the vehicle's electrical system are shown in FIG. 3. A circuit board 36 includes a microprocessor 46 which, in the preferred embodiment, is an HC-11 microprocessor manufactured by the Motorola Corporation. The vehicle wire harness 48 of the vehicle's internal bus system is connected to the circuit board and provides ignition voltage, battery voltage, signal ground, and bus lines bus+ and bus–. A voltage regulator 50 mounted on the circuit board receives the ignition and battery voltages and produces regulated voltages VCC, VAA, and VBB. Voltages VCC and VBB are generated from the ignition voltage and thus are available only when the ignition is on. Voltage VAA is generated from the battery voltage and thus is continuously available. Bus lines bus+ and bus– are coupled to the microprocessor through a conventional bus interface circuit 52 to provide a communication link between the microprocessor 46 and the vehicle's internal electrical systems.

The system of the present invention is capable of implementing a variety of electronic accessory modules (generally identified by reference numeral 38 in FIG. 1) which contain software and/or hardware that communicates with and is coupled to the microprocessor to provide a variety of vehicular features. Specifically, in the preferred embodiment of the present invention, a compass module 44 (FIG. 3), a garage door opener module 64, a remote keyless entry module 66, a two-way pager module 68, an electrochromic mirror module 70, and an expansion port module 72 are available and can be selectively and collectively added to the vehicle. The pager module can receive information transmitted by a navigational information service, thus enabling a navigation system to be also implemented. Alternatively, a separate navigation module can be employed having navigational circuitry such as that described in U.S. Pat. No. 5,323,321, assigned to the Motorola Corporation. Unlike the other modules, the expansion port module does not provide any vehicular features, but instead provides an interface for additional modules, such as a printer, cellular telephone, etc. requiring the same or fewer communication lines with the circuit board and microprocessor as provided by the expansion port module.

Except for the electrochromic mirror module and the compass module, all of the above-mentioned modules are snapped into receptacles 34 shown in FIG. 1 in order to connect with the circuit board 36. The electrochromic mirror module 70, if implemented, is mounted behind wall 32 and is electrically connected to the circuit board by means of a plug 71 on module 70 and a socket 60 oil circuit board 36 as shown in FIG. 3. The compass feature of the preferred embodiment is a compass module 44 including a magnetic field sensor which is mounted to circuit board 36. In other embodiments, the compass module including a sensor could be another one of the separate plug-in accessory modules 38. The connection between the mother circuit board 36 and those electronic accessory modules 38 that snap into receptacles 34 is now described.

The electrical socket or plug structure of each module 38 is configured such that its input and output terminals electrically couple the module to an associated connector on the circuit board when the module is mechanically snapped into one of the apertures or receptacles 34, with the mechanical connection between the modules and receptacles 34 sufficient to retain the modules in place. Each of the modules 38 are of a shape and size to enable cover 26 of first enclosure 30 to be closed after insertion of the modules into the receptacles. Beneath each receptacle 34, the circuit board 36 has connecting sockets or plugs which mate with the associated plugs or sockets of the modules to provide the electrical connection between the modules and the circuit board. Each such connecting port so defined of the circuit board 36 is dedicated to the reception of a particular electronic module. In FIG. 3, circuit board 36 has connecting sockets or ports 54, 56, 58, 60, and 62 for electrical connection with the plug 65 of a garage door opener module 64, the plug 67 of a remote keyless entry module 66, the plug 69 of a pager module 68, the plug 71 of an electrochromic mirror module 70, and the plug 73 of an expansion port module 72, respectively, with receptacles 34 not shown for the sake of simplicity.

Figure 4:
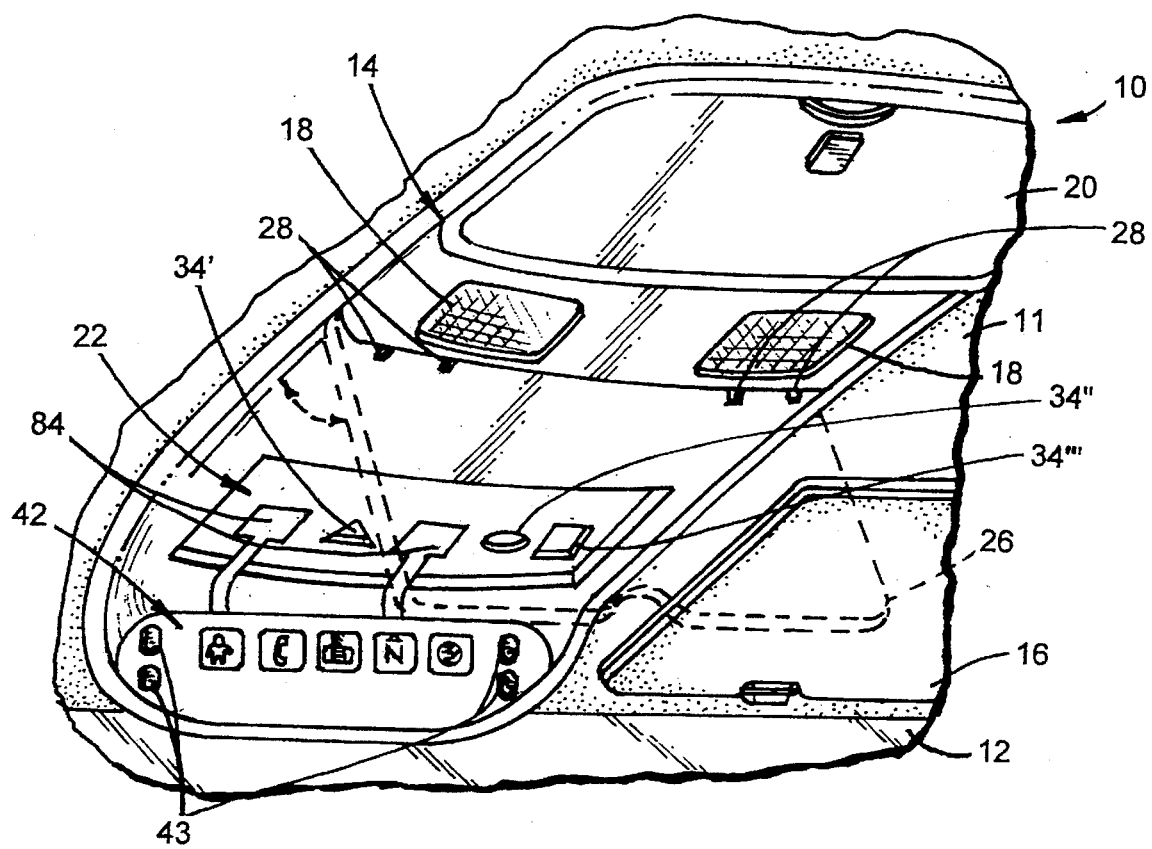
FIG. 4 is a fragmentary perspective view of the interior of the vehicle showing an alternative embodiment of the system of the present invention which prevents the connection of electronic modules that are incompatible with a particular display.

To facilitate the connection of the proper module within the proper receptacle, the modules 38 and receptacles 34 can be color-coded in a preferred embodiment of the invention. In FIG. 1, for example, floor 32 is shown having identifying color indicia such as rings 35 each having a color uniquely identifying and associated with a corresponding exterior color of a particular accessory module 38. For such purpose, the housing (if employed) for a module can be molded of a polymeric material color-coded to a particular identifying color indicia 35 of the corresponding receptacle. Alternatively, the receptacles and accessory modules can be shaped such that only one module will fit into any particular receptacle. FIG. 4 shows a triangular receptacle 34', a circular receptacle 34", and a square receptacle 34'", each corresponding in shape to the physical external shape of the electrical socket or plug of a particular accessory module 38. The modules typically include a circuit board such as board 61 (FIG. 3) associated with garage door opener module 64 which in turn is mounted within a color-coded or shape keyed housing 63. The housing may leave a projection 53 (FIG. 3) surrounding a conventional plug or socket 65 which projection has a geometric shape which corresponds to the geometric shape of the receptacles 34', 34", 34'" (FIG. 4). Alternatively, the electrical plugs or sockets of the modules themselves can have an unique configuration allowing only the correct module to be plugged into the associated connector on mother board 36.

In the preferred embodiment described above, mother circuit board 36 is mounted above floor 32 and receives accessory modules 38 through receptacles 34. Alternatively, mother circuit board 36 may be mounted directly to the exposed surface of floor 32. In this embodiment, connecting sockets or plugs of the circuit board may be color-coded or shape keyed to facilitate the connection of the associated accessory modules.

Modules 38 are configured such that their input and output terminals match with terminals provided at their respective connecting ports. Upon insertion into receptacles 34, these terminals enable each of the modules to obtain its operating voltage and signal information from the circuit board, with the garage door opener, remote keyless entry, and pager modules receiving regulated battery voltage VAA such that they are operable when the vehicle's ignition is off. Although the garage door opened module obtains only its operating voltage and signal ground from the circuit board, the remaining terminals of the other modules are electrically connected to the microprocessor such that information and control signals can be communicated between them. For example, signals received by the remote keyless entry receiver module from a remote keyless entry key fob transmitter are applied to the microprocessor when either a lock or unlock command has been received. With respect to the two-way pager module, RF frequency messages received from a remote paging transmitter are applied from the module to the microprocessor, and subsequently to an associated alpha-numeric display. With respect to the electrochromic mirror module, signals generated from photocells located on the module are transmitted to the microprocessor, and control signals are transmitted from the microprocessor to the module indicating the required level of dimming. As described below, the programming of the microprocessor automatically interfaces the modules with the electrical system of the vehicle such that these signals can be communicated therebetween when necessary.

The additional features provided by various accessory modules may require information to be displayed to the vehicle's driver. This information is displayed by means of selectable levels of displays 78, 80, or 82 (FIG. 3) with all three display boards being shown in FIG. 3, it being understood that only one display board and its associated display will be mounted within the socket 40 of the second mounting area 24 of housing 14 (FIG. 1) at any given time. Although it is possible to provide a single display capable of displaying information associated with all of the modules, such a display, with its expanded capability, may be an unnecessary expense unless all of the modules are to be implemented. Instead, it is preferable to provide different levels of display boards, each having increasing display capability. As such, the preferred embodiment of the present invention provides a system in which particular levels of displays, compatible with particular modules, are provided to be cost effective. When higher levels of accessories are ordered, an upgraded display is provided.

In a preferred embodiment of the present invention, three displays 78, 80, and 82 (FIG. 3) are available. Each of the various displays can be of a commercially available type such as vacuum fluorescent, LCD or LED, as desired and suitable display drivers and operating power is provided by the circuit board 36 when the display is plugged into socket 40. The first display 78 is a lower-level display for use with only the compass, garage door opener, and electrochromic mirror modules. This display includes direction indicating indicia as well as indicia for various vehicle warning signals indicating that certain conditions exist such as doors open, oil level low, anti-lock braking system in use, or that the trunk is open. The microprocessor 46 provides these warning signals to the display according to signals generated in the vehicle's electrical systems and transmitted over the vehicle's internal bus lines.

The lower-level display 78 can be replaced and upgraded to the mid-level display 80 which, while providing all of the features of the lower-level display, includes an alpha-numeric line or multiple lines for displaying paging messages received by the pager module 68. Additionally, the mid-level display 80 can display temperature information according to bus signals generated from a temperature sensor located on the vehicle, and can display trip information that is programmed in the microprocessor and updated according to bus signals relating to the movement of the vehicle. The mid-level display 80 can be replaced and upgraded to the high-level display 82 that is a reconfigurable display which, while providing all of the features of the mid-level display, can additionally display information relating to navigation of the vehicle. In the preferred embodiment, the reconfigurable high-level display is a display having at least 128×32 pixels.

In FIG. 3, the three different display boards are separated by dashed lines for illustration of the connection of each of the displays to the circuit board 36 and microprocessor, it being understood that only one of the displays is installed at a given time. Each display will provide compass heading information for the board mounted compass circuit 44 of the preferred embodiment. Shown is a lower-level display 78, a mid-level display 80, and a high-level display 82. Socket 40 connects the circuit board 36 to the plug 81 of a particular display board, providing the display with regulated voltages VCC and VAA as well as signal ground. Although socket 40 is shown integral with circuit board 36 in FIG. 3, the microprocessor's display communication lines may extend beyond the circuit board such that socket 40 is remote and the display can be more conveniently located, as shown in FIG. 1. Regardless of which display is implemented, connection is made with pins PA3, PD0, and PD1 of the microprocessor. To implement the additional functions of the high-level display, additional communication lines are provided by connection to pins PC0 through PC7, pins PB0 through PB7, and pins PA4 and PA5 of the microprocessor. As discussed below, connection of the microprocessor to one of the displays causes one of inputs PA0, PA1, or PA2 to be grounded, thus enabling the microprocessor to identify which display board is connected.

Due to the incompatibility of certain display boards with certain modules, it is desirable to prevent certain accessory modules 38 from being connected to the microprocessor board 36 when an incompatible display board is plugged into mechanical socket 40. FIG. 4 shows an embodiment of the present invention in which display board 42 is adjacent to first mounting area 22, and cover 26 (FIG. 2) has rearwardly located hinges 28 such that it opens away from the second recess. In this embodiment, cover 26 must be opened in order to connect display board 42, as shown with dashed lines in FIG. 4. Mechanical stoppers 84 extend from the display board 42 and obstruct particular receptacles 34', 34" and 34'" so as to prevent connection of incompatible modules 38. Stoppers 84 may be of varied sizes and shapes, with FIG. 4 showing only one embodiment thereof. Regardless of their shape, they are formed of a semi-rigid plastic material and extend from the display area 24 into the accessory module area 22. In an alternative embodiment, or as an additional means of prevention, the microprocessor can be programmed to ignore any modules that may be attached which are incompatible with the particular display board 42 currently in use. The electronic accessory modules and display boards are then automatically interfaced with the vehicle's electrical system upon installation by their connection with the microprocessor. The microprocessor controls and coordinates the operation of the modules and displays, and their interaction with the vehicle's electrical system, by means of internal programming now described.

Figure 5:
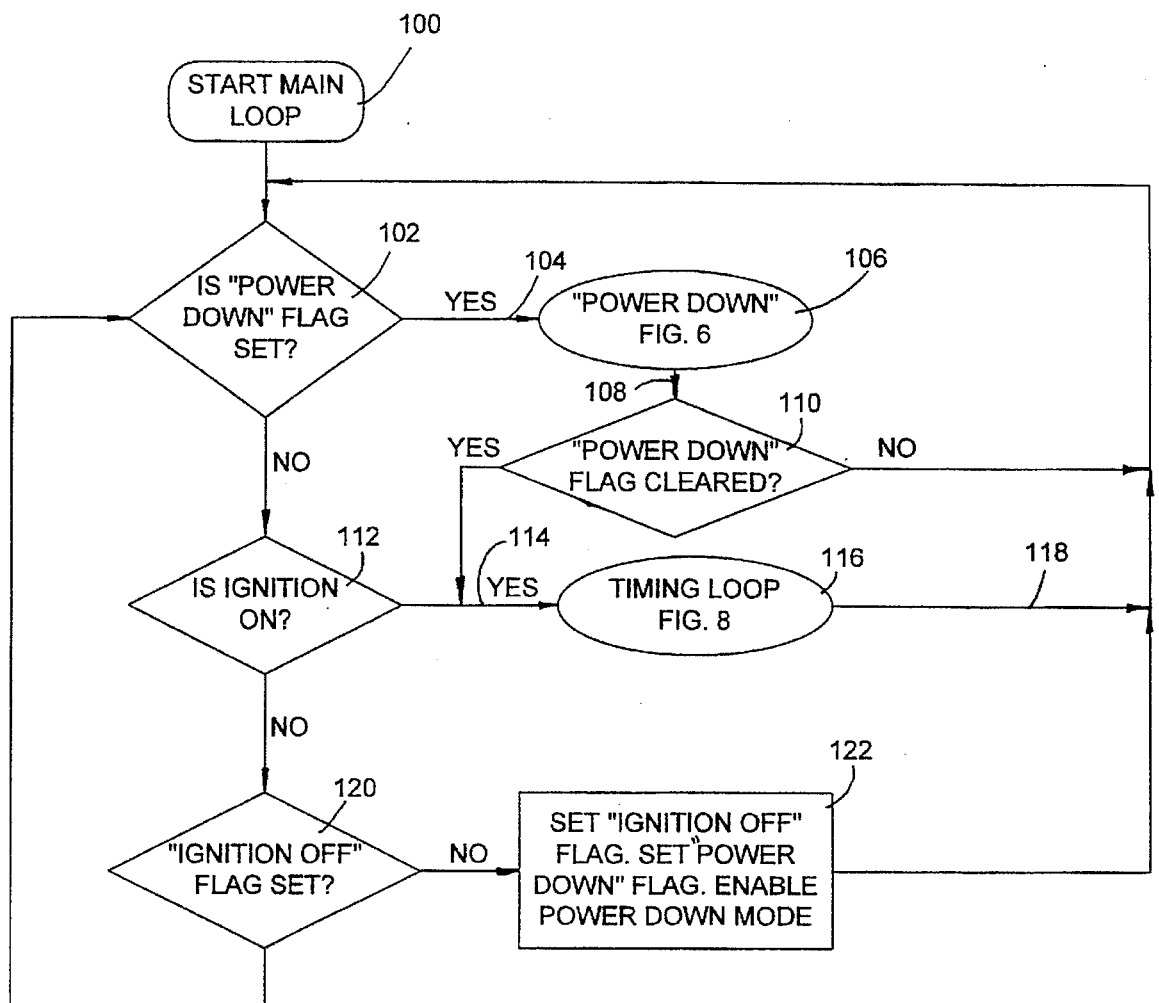
FIGS. 5–35 are flow diagrams of the programming of the microcontroller to recognize and operate the various combinations of electronic modules and displays of the system of the present invention.

The main program for microprocessor 46 is shown in FIG. 5. The program begins with block 100 that signifies the beginning of the main program loop. Next, block 102 of the program determines whether the microprocessor is in the "power up" mode or the "power down" mode. The microprocessor is typically in the "power down" mode, or low power mode, when the ignition is off. If a "Power Down" flag is set indicating that the microprocessor is in the "power down" mode, the program proceeds through input line 104 to the POWER DOWN subroutine, block 106, to determine whether the microprocessor should be awakened. The POWER DOWN subroutine is shown and described in greater detail below in connection with FIG. 6. Upon return from the POWER DOWN subroutine through its output line 108, the program proceeds to block 110 to determine whether the "Power Down" flag is clear due to execution of that subroutine. If the flag is not clear, the program returns to block 102 of the main program loop. If the flag is cleared, then the program proceeds through input line 114 to the TIMING LOOP subroutine, block 116, where the microprocessor performs most of its functions. The TIMING LOOP subroutine is described in greater detail below in connection with FIG. 8. Upon return from the TIMING LOOP subroutine through its output line 118, the program returns to block 102 of the main program loop. If block 102 determines that the "Power Down" flag is not set, the program proceeds to block 112 to determine whether the ignition is on. If the ignition is on, the program proceeds through input line 114 to block 116, the TIMING LOOP subroutine, wherein the microprocessor performs most of its functions. If the ignition is off, the program proceeds to block 120 to determine whether an "Ignition Off" flag is set. If the flag is set, the program returns to block 102 of the main program loop. If the flag is not set, the program proceeds to block 122 wherein the microprocessor sets the "Ignition Off" and "Power Down" flags, and begins the power down mode. The program then loops back to block 102.

Figure 6:
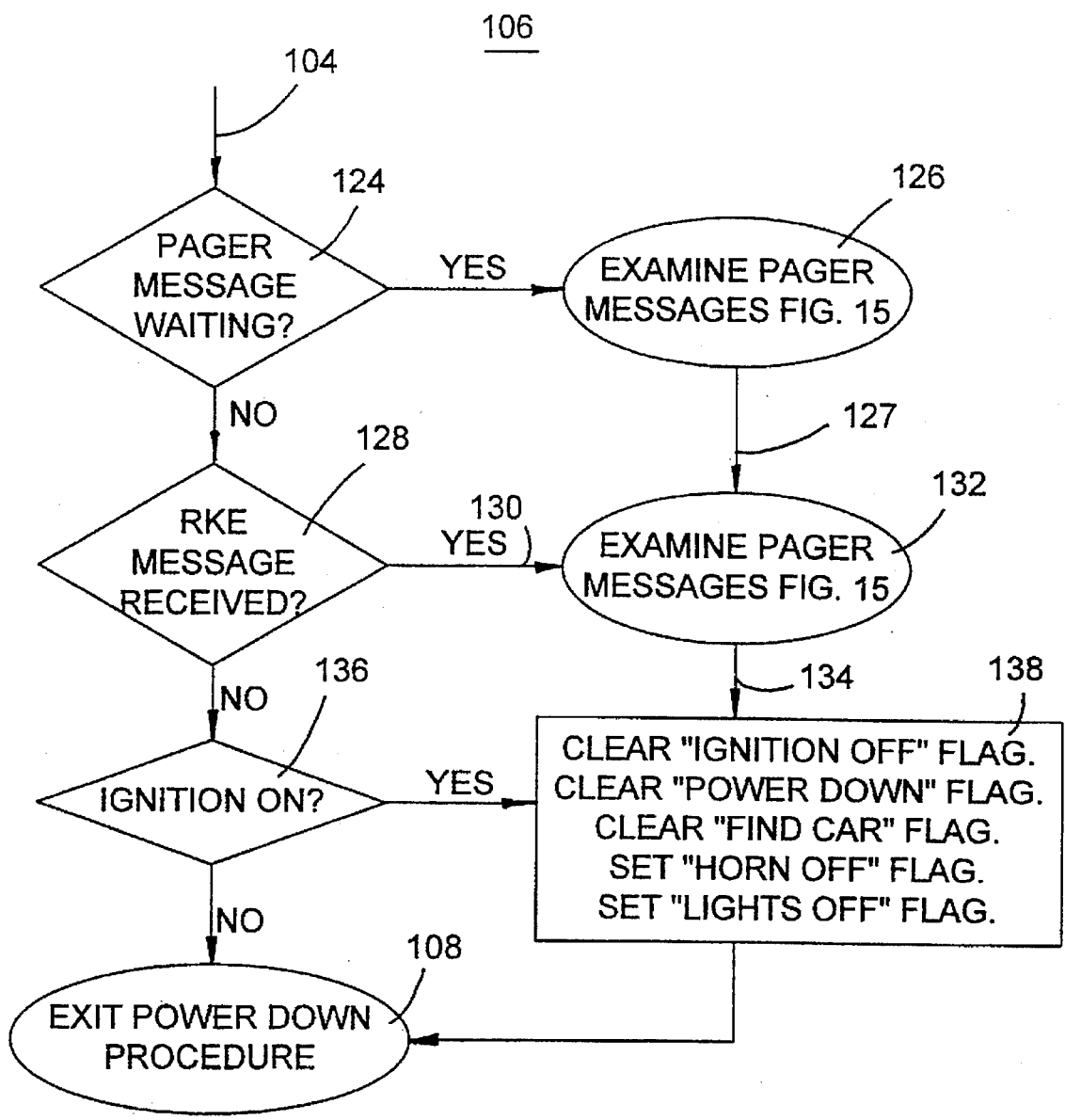

Referring to FIG. 6, the POWER DOWN subroutine 106 is shown. This subroutine is entered through input line 104 and begins with block 124 which determines if a pager message has been received by the pager module and stored in the pager buffer. If a pager message has been received, the program proceeds to the EXAMINE PAGER MESSAGES subroutine, block 126, described in greater detail below in connection with FIG. 15. Upon return from the EXAMINE PAGER MESSAGES subroutine, the program proceeds through input line 127 to the EXAMINE RKE MESSAGES subroutine, block 132, described in greater I0 detail below in connection with FIG. 7. Upon return from the EXAMINE RKE MESSAGES subroutine through output line 134, block 138 clears the "Ignition Off", "Power Down", and "Find Car" flags, and sets the "Horn Off" and "Lights Off" flags. The program then returns to the main program loop of FIG. 5 via block 108 which is the output line of the POWER DOWN subroutine. If block 124 determines that a pager message has not been received, then the subroutine proceeds to block 128 to determine whether a remote keyless entry (RKE) message has been received. If a RKE message has been received, then the program proceeds through input line 130 to the EXAMINE RKE MESSAGES subroutine, block 132. If block 128 determines that a RKE message has not been received, the subroutine proceeds to block 136 to determine whether the ignition is on. If the ignition is on, then the subroutine proceeds to block 138 which is described above. If block 136 determines that the ignition is off, then the program returns to the main program loop of FIG. 5 via block 108.

Figure 7:
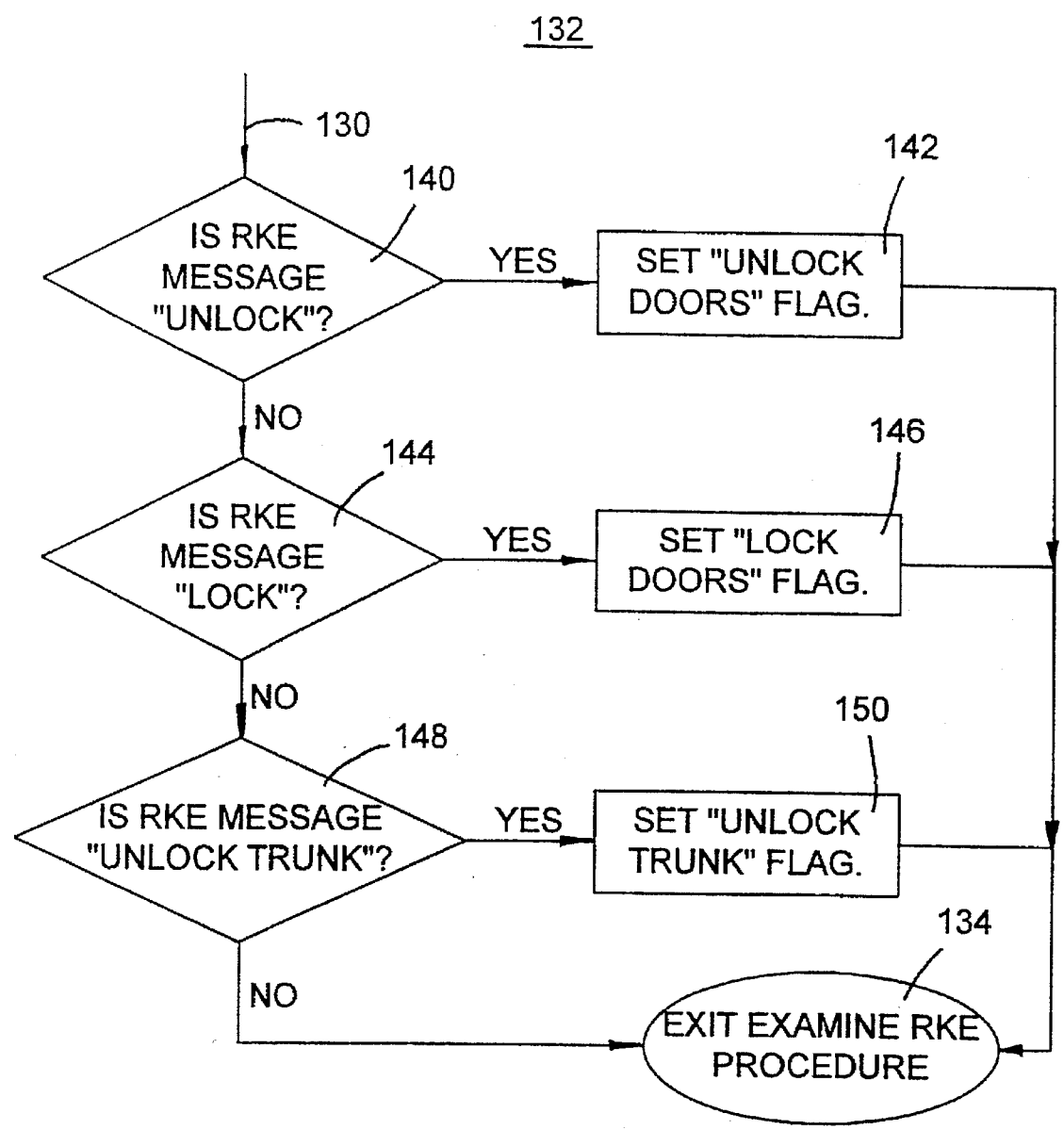

FIG. 7 shows the EXAMINE RKE MESSAGES subroutine 132. This subroutine is entered through input line 130 and begins with block 140 which determines whether the RKE message is an "Unlock" message, and, if it is, proceeds to block 142 which sets the "Unlock Doors" flag. The program then returns to the POWER DOWN subroutine of FIG. 6 via block 134 which is the output line of the EXAMINE RKE MESSAGES subroutine. If block 140 determines that the RKE message is not an "Unlock" message, then the subroutine proceeds to block 144 which determines if it is a "Lock" message. If it is, then block 146 sets the "Lock Doors" flag, and the program returns to the POWER DOWN subroutine of FIG. 6 via block 134. If block 144 determines that the RKE message is not a "Lock" message, then the subroutine proceeds to block 148 which determines if it is an "Unlock Trunk" message. If it is, then block 150 sets the "Unlock Trunk" flag, and the program returns to FIG. 6 via block 134. If the RKE message is not an "Unlock Trunk" message, then the program returns to FIG. 6 via block 134.

Figure 8:
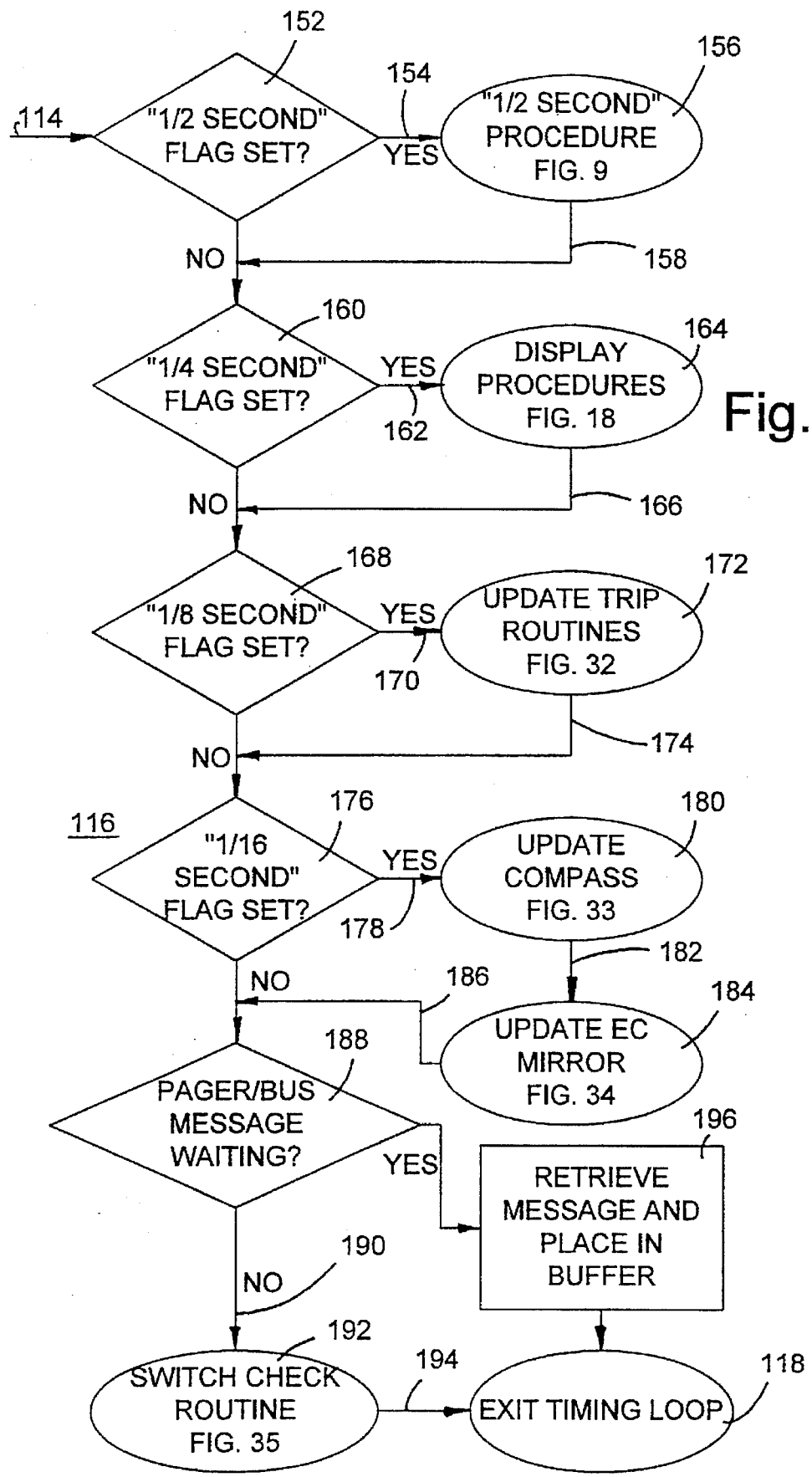

FIG. 8 shows the TIMING LOOP subroutine 116, the operation of which is dependent upon a timer in the microprocessor which sets a flag every ½ second, ¼ second, ⅛ second, and ¹⁄₁₆ second. This subroutine is entered through input line 114 and begins with block 152 which determines whether the "½ Second" flag is set and, if it is, proceeds through input line 154 to the ½ SECOND PROCEDURE subroutine 156 wherein the microprocessor performs all functions required every ½ second. The ½ SECOND PROCEDURE subroutine is described in greater detail below in connection with FIG. 9. Upon return from the ½ SECOND PROCEDURE subroutine through output line 158, or if the "½ Second" flag is not set in block 152, the program proceeds to block 160. Block 160 determines whether the "¼ Second" flag is set and, if it is, the program proceeds through input line 162 to the DISPLAY PROCEDURES subroutine 164 which updates the information supplied to the display every ¼ second. The DISPLAY PROCEDURES subroutine is described in greater detail below in connection with FIG. 18. Upon return from the DISPLAY PROCEDURES subroutine through output line 166, or if block 160 determines that the "¼ Second" flag is not set, the program proceeds to block 168. Block 168 determines whether the "⅛ Second" flag is set and, if it is, the program proceeds through input line 170 to the UPDATE TRIP ROUTINES subroutine 172 which updates the vehicle's trip functions every ⅛ second. The UPDATE TRIP ROUTINES subroutine is described in greater detail below in connection with FIG. 32. Upon return from the UPDATE TRIP ROUTINES subroutine through output line 174, or if block 168 determines that the "⅛ Second" flag is not set, the program proceeds to block 176. Block 176 determines whether the "¹⁄₁₆ Second" flag is set and, if it is, the program proceeds through input line 178 to the UPDATE COMPASS subroutine 180, described in greater detail below in connection with FIG. 33. Upon return from the UPDATE COMPASS subroutine, output line 182 thereof becomes input line 182 of the UPDATE EC MIRROR subroutine 184, described in greater detail below in connection with FIG. 34. Upon return from the UPDATE EC MIRROR subroutine through output line 186, or if block 176 determines that the "¹⁄₁₆ Second" flag is not set, the program proceeds to block 188. Block 188 determines whether a pager or bus message is waiting and, if one is, the subroutine proceeds to block 196 wherein the message is retrieved and placed in the message buffer. The program then returns to the main program loop of FIG. 5 via block 118 which is the output line of the TIMING LOOP subroutine. If block 188 determines that neither a pager message nor a bus message is waiting, then the program proceeds through input line 190 to the SWITCH CHECK subroutine 192 to determine if any control switches 43 (FIG. 2) associated with the display board have been actuated. This subroutine is described in greater detail below in connection with FIG. 35. Upon return from the SWITCH CHECK subroutine through output line 194, the program returns to FIG. 5 via block 118.

Figure 9:
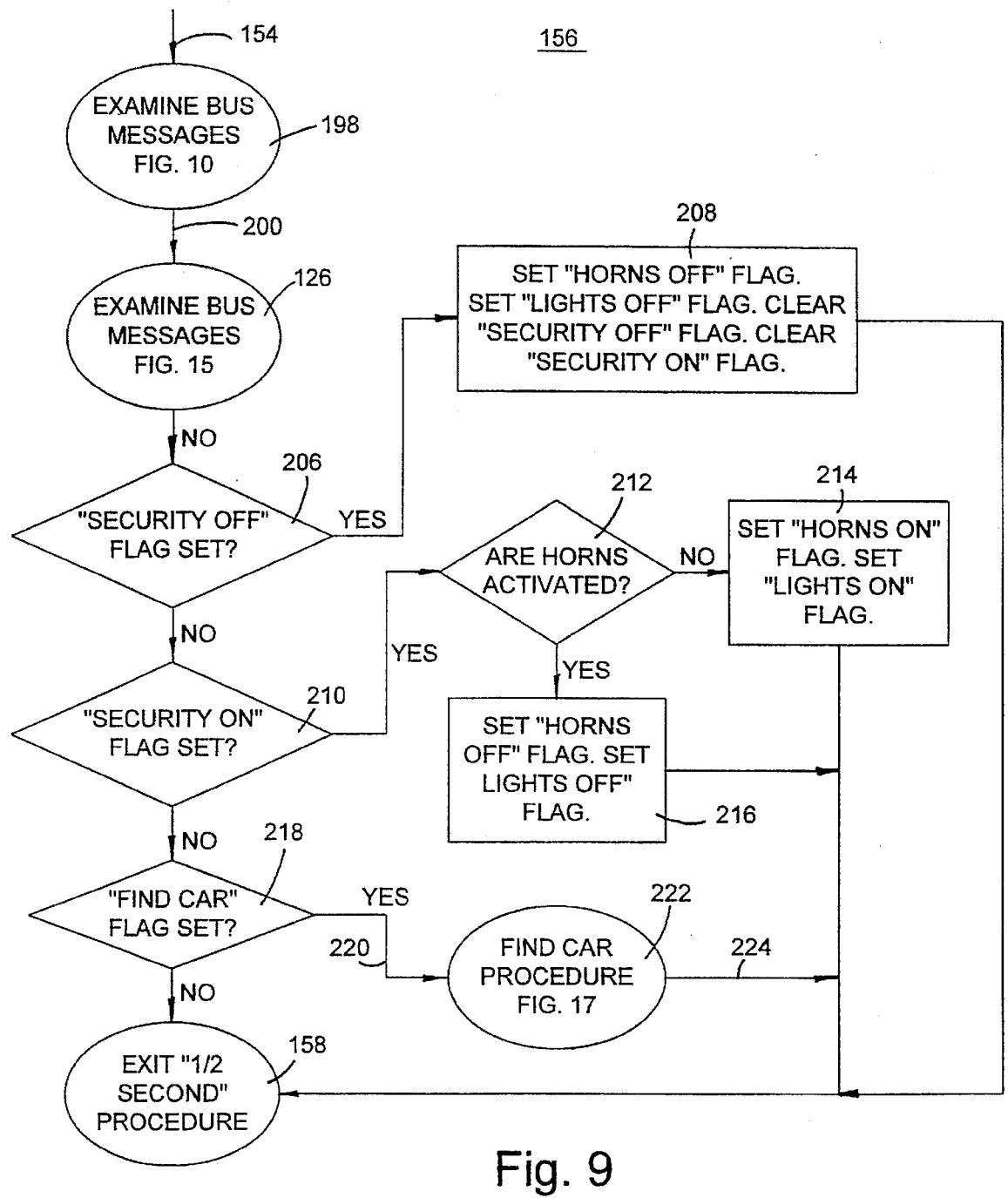

Referring to FIG. 9, the ½ SECOND PROCEDURE subroutine 156 is shown wherein the microprocessor performs those functions required every ½ second. This subroutine is entered through input line 154 which is also the input line to the EXAMINE BUS MESSAGES subroutine 198, described in greater detail below in connection with FIG. 10. Upon return from the EXAMINE BUS MESSAGES subroutine through output line 200, the program proceeds to the EXAMINE PAGER MESSAGES subroutine 126, described in greater detail below in connection with FIG. 15. Upon return from the EXAMINE PAGER MESSAGES subroutine, block 206 determines whether the "Security Off" flag is set. If the flag is set, then block 208 sets the "Horns Off" and "Lights Off" flags, and clears the "Security Off" and "Security On" flags. The program then returns to the TIMING LOOP subroutine of FIG. 8 via block 158 which is the output line of the ½ SECOND PROCEDURE subroutine. If block 206 determines that the "Security Off" flag is not set, then the program proceeds to block 210 which determines if the "Security On" flag is set. This flag can be set by the vehicle owner by means of a paging message received by the pager module 68 in the event the vehicle has been stolen. If the flag is set, the subroutine proceeds to block 212 and, using information obtained by the microprocessor via the bus lines connected to the vehicle's electrical system, determines whether the horns are activated. If the horns are not activated, block 214 sets the "Horns On" and "Lights On" flags, and the program returns to FIG. 8 via block 158. If block 212 determines that the horns are activated, then block 216 sets the "Horns Off" and "Lights Off" flags, and the program returns to FIG. 8 via block 158. Thus, blocks 216 and 214 set flags which, as described below, cause the horns and lights to be alternately turned on and off with each pass through the ½ SECOND PROCEDURE subroutine, thus drawing attention to the stolen vehicle and thief. If block 210 determines that the "Security On" flag is not set, block 218 then determines whether the "Find Car" flag is set. This flag is set by the vehicle's owner, again by means of the pager 68, to pinpoint the location of a parked vehicle. If the flag is set, the program proceeds through input line 220 to the FIND CAR PROCEDURE subroutine 222, described in greater detail below in connection with FIG. 17. Upon return from the FIND CAR PROCEDURE subroutine through output line 224, the program returns to FIG. 8 via block 158. If block 218 determines that the "Find Car" flag is not set, the program returns to FIG. 8 via block 158.

Figure 10:
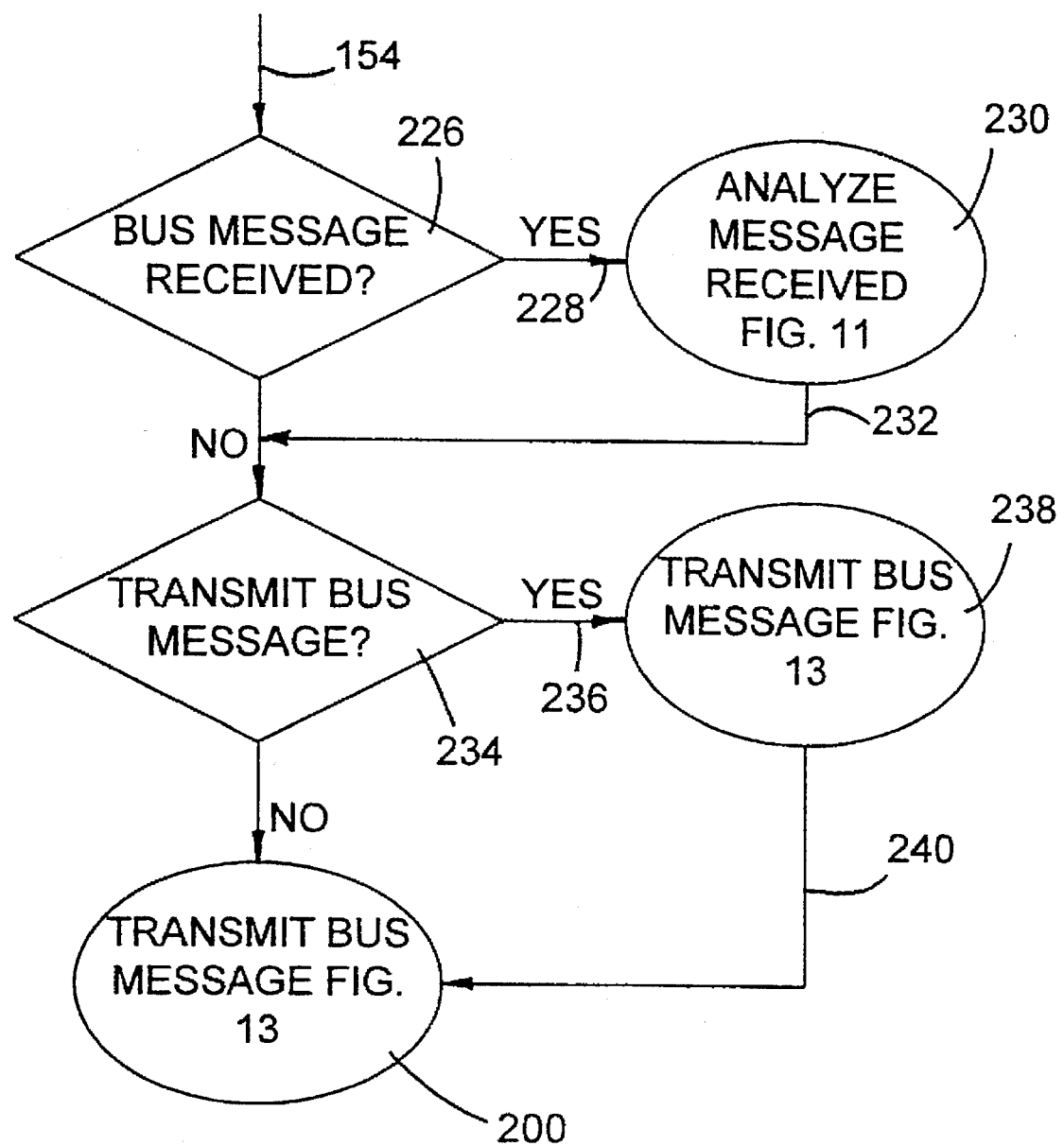

Referring to FIG. 10, the EXAMINE BUS MESSAGES subroutine 198 is shown. This subroutine is entered through input line 154 and begins with block 226 which examines the interface buffer to determine if a bus message has been received over the bus+ or bus– lines. If a message has been received, the program proceeds through input line 228 to block 230 which is the ANALYZE MESSAGE RECEIVED subroutine, described in greater detail below in connection with FIG. 11. Upon return from the ANALYZE MESSAGE RECEIVED subroutine through output line 232, or if block 226 determines that a message has not been received, the program proceeds to block 234 to determine if a flag has been set indicating that the microprocessor needs to transmit a message over the bus lines. If it is, the program proceeds through input line 236 to the TRANSMIT BUS MESSAGE subroutine, block 238, described in greater detail below in connection with FIG. 13. Upon return from the TRANSMIT BUS MESSAGE subroutine through output line 240, or if block 234 determines that no message needs to be transmitted, the program returns to the ½ SECOND PROCEDURE subroutine of FIG. 9 via block 200 which is the output line of the EXAMINE BUS MESSAGES subroutine.

Figure 11:
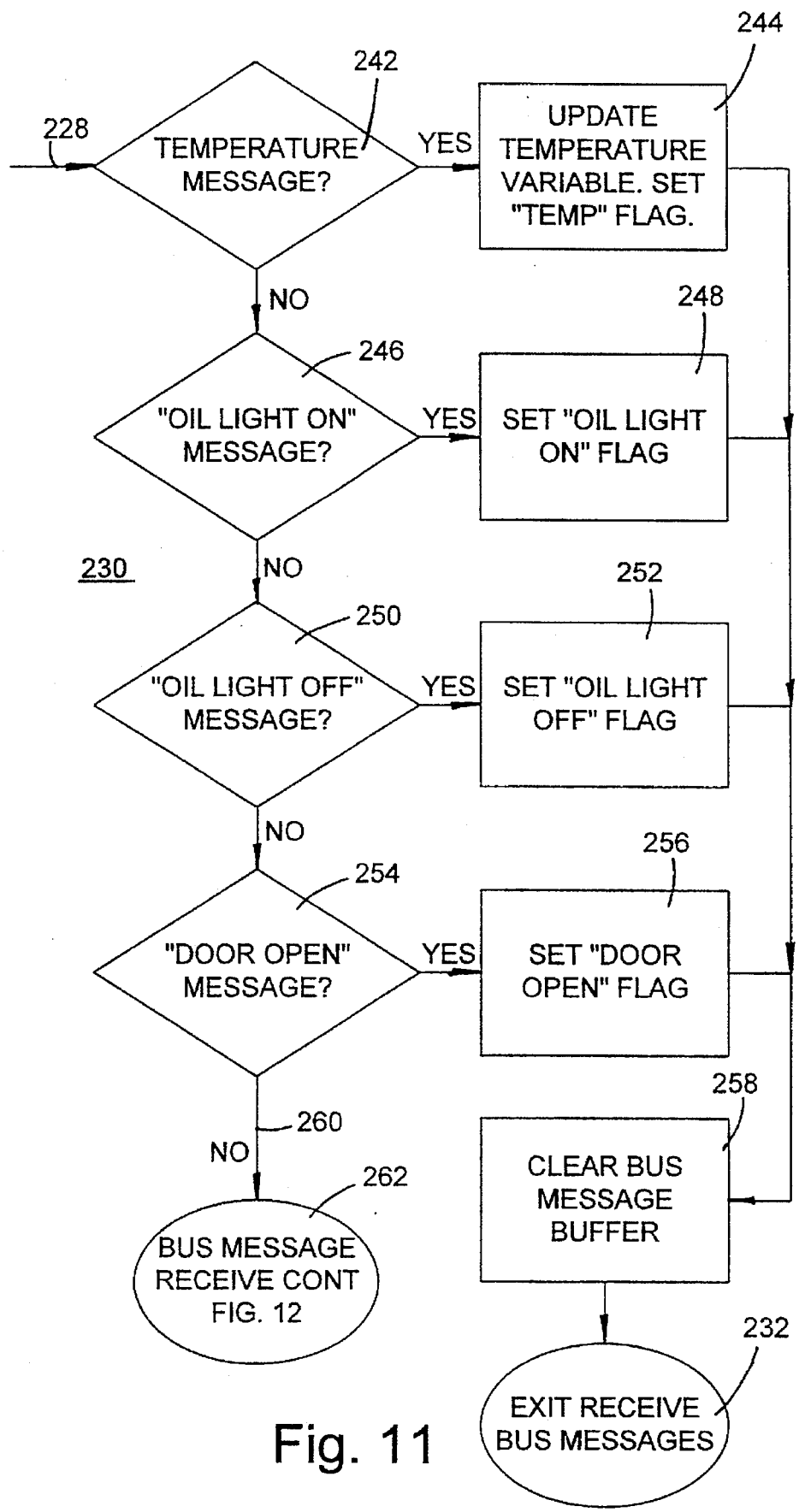

The ANALYZE MESSAGE RECEIVED subroutine is shown in FIG. 11. This subroutine is entered through input line 228 and begins with block 242 which determines if the bus message received was a temperature message sent by a temperature sensor connected to the vehicle's electrical system. If it is, the program proceeds to block 244 which updates the temperature variable, displayed continuously on both the mid- and high-level displays, and sets the "Temp" flag. The subroutine then proceeds to block 258 which clears the bus message buffer, and the program returns to the EXAMINE BUS MESSAGES subroutine of FIG. 10 via block 232 which is the output line for the ANALYZE MESSAGE RECEIVED subroutine. If block 242 determines that the bus message received was not a temperature message, the subroutine similarly proceeds through blocks 246, 250, and 254 to determine if the message received was an "Oil light on" message, an "Oil light off" message, or a "Door Open" message, respectively. Each of these messages is typically generated by a sensor connected to the vehicle's electrical system. If the message received corresponds to one of these messages, the subroutine proceeds to one of blocks 248, 252, or 256, respectively, to set the appropriate flag for subsequent display of the message, as described below. The bus message buffer is then cleared in block 258, and the program returns to FIG. 10 via block 232. If the message received does not correspond to one of the above messages, the program proceeds through input line 260 to the BUS MESSAGE RECEIVED CONT subroutine, block 262, now described.

Figure 12:
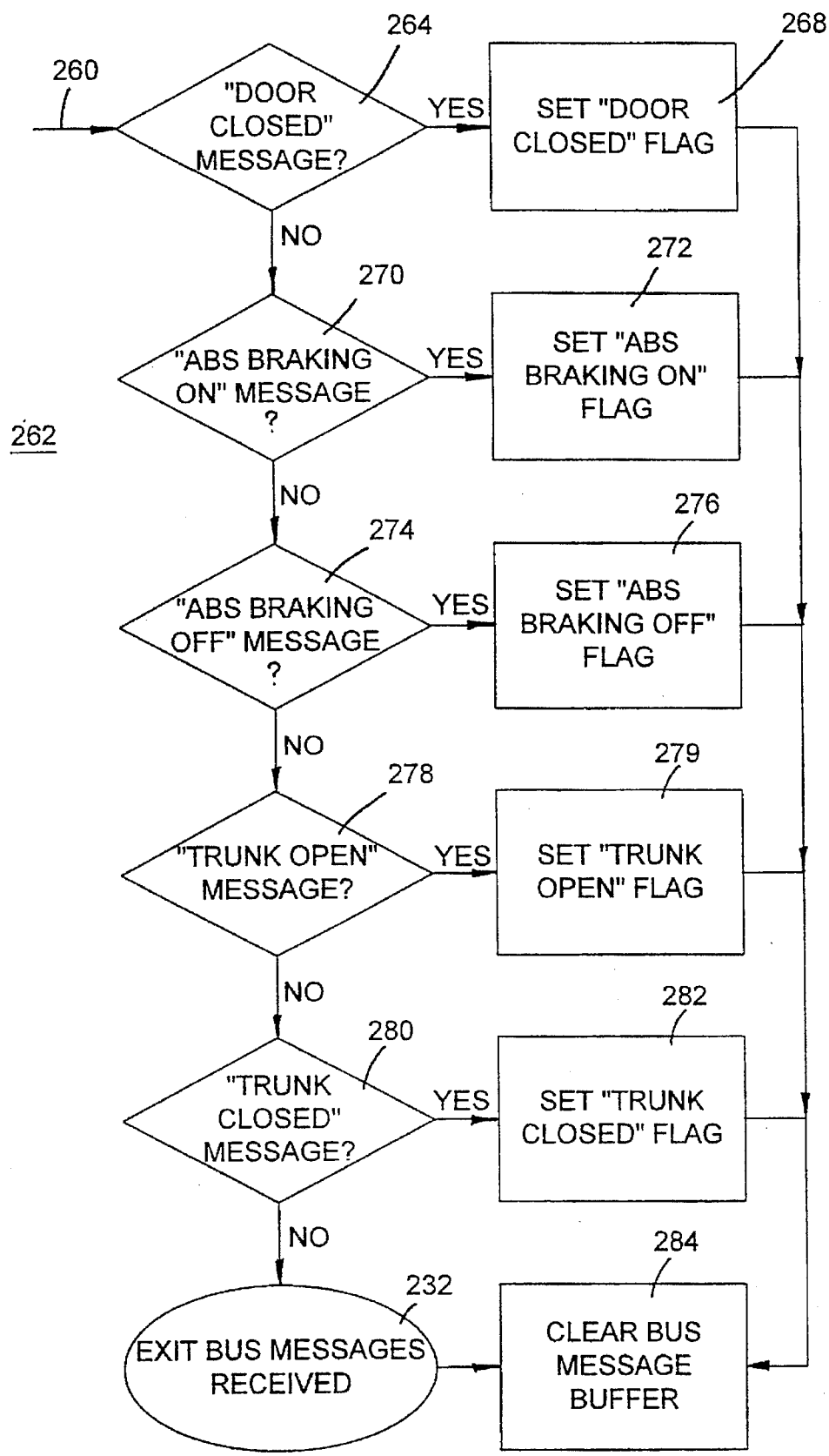

FIG. 12 shows the BUS MESSAGE RECEIVED CONT subroutine 262. This subroutine is entered through input line 260 and begins with block 264 which determines if the bus message received was a "Door Closed" message. If it is, block 268 sets the "Door Closed" flag, and the subroutine proceeds to block 284 which clears the bus message buffer. The program then returns to the EXAMINE BUS MESSAGES subroutine of FIG. 10 via block 232 which is the output line of the BUS MESSAGE RECEIVED CONT subroutine. If block 264 determines that the bus message received was not a "Door Closed" message, the subroutine proceeds through blocks 270, 274, 278, and 280 to determine if the bus message received was an "ABS Braking on" message, an "ABS Braking off" message, a "Trunk open" message, or a "Trunk closed" message, respectively. Each of these messages is typically generated by a sensor connected to the vehicle's electrical system. If the bus message corresponds to one of these messages, the subroutine proceeds to one of blocks 272, 276, 279, or 282, respectively, to set the appropriate flag for subsequent display of the message as described below. The bus message buffer is then cleared in block 284, and the program returns to the EXAMINE BUS MESSAGES subroutine of FIG. 10 via block 232. If the bus message does not correspond to one of the above messages, the program returns to FIG. 10 via block 232.

Figure 13:
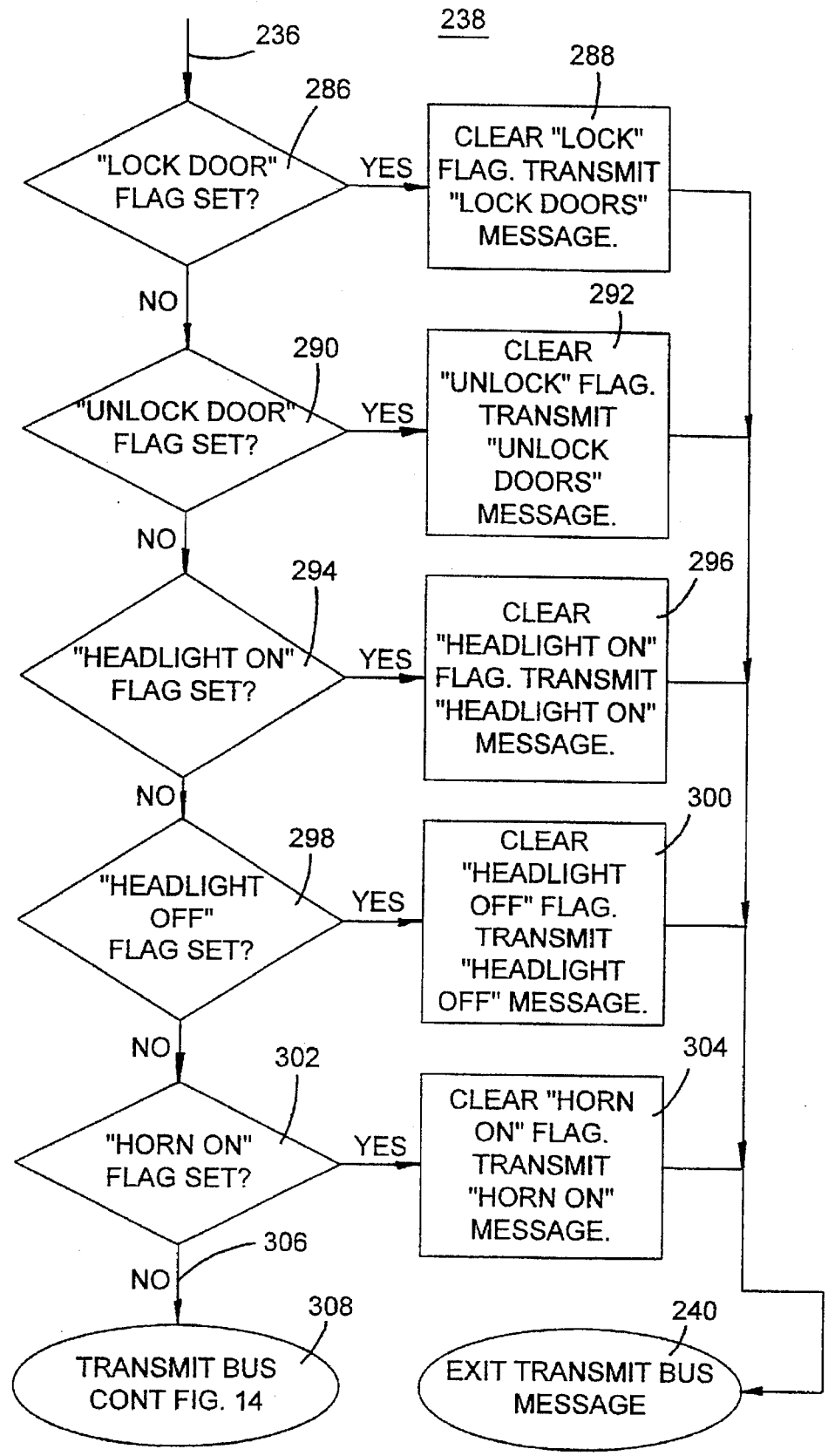

Referring to FIG. 13, the TRANSMIT BUS MESSAGE subroutine 238 is shown. This subroutine is entered through input line 236 and begins with block 286 which determines if a "Lock Door" flag has been set by the pager module 68. If the flag is set, the program proceeds to block 288 which clears the flag and transmits a "Lock Doors" message over the bus lines to the main vehicle computer which signals the electric door locks to lock. The program then returns to the EXAMINE BUS MESSAGES subroutine of FIG. 10 via block 240 which is the output line of the TRANSMIT BUS MESSAGE subroutine. If block 286 determines that the "Lock Door" flag is not set, the subroutine proceeds to block 290 which determines if an "Unlock Door" flag has been set by the pager module. If the flag is set, the subroutine proceeds to block 292 which clears the flag and transmits an "Unlock Doors" message over the bus lines to the main vehicle computer to unlock the doors. The program then returns to the EXAMINE BUS MESSAGES subroutine of FIG. 10 via block 240. If block 290 determines that the "Unlock Door" flag is not set, the program proceeds to block 294 which determines if a "Headlight On" flag has been set during either the security or "find vehicle" functions executed during the ½ SECOND PROCEDURE subroutine of FIG. 9. If the flag is set, the program proceeds to block 296 which clears the "Headlight On" flag and transmits a "Headlight On" message over the bus lines to turn the headlights on. The program then returns to the EXAMINE BUS MESSAGES subroutine of FIG. 10 via block 240. If block 294 determines that the "Headlight On" flag is not set, the subroutine proceeds to block 298 which determines if the "Headlight Off" flag has been set. If the flag is set the subroutine proceeds to block 300 which clears the flag and transmits a "Headlight Off" message over the bus lines to turn the headlights off. The program then returns to the EXAMINE BUS MESSAGES subroutine of FIG. 10 via block 240. If block 298 determines that the "Headlight Off" flag is not set, block 302 determines if the "Horn On" flag is set. If the flag is set, the subroutine proceeds to block 304 which clears the flag and transmits a "Horn On" message over the bus lines to activate the vehicle's horn. The program then returns to the EXAMINE BUS MESSAGES subroutine of FIG. 10 via block 240. If block 302 determines that the "Horn On" flag is not set, the program proceeds through input line 306 to the TRANSMIT BUS CONT subroutine 308, now described.

Figure 14:
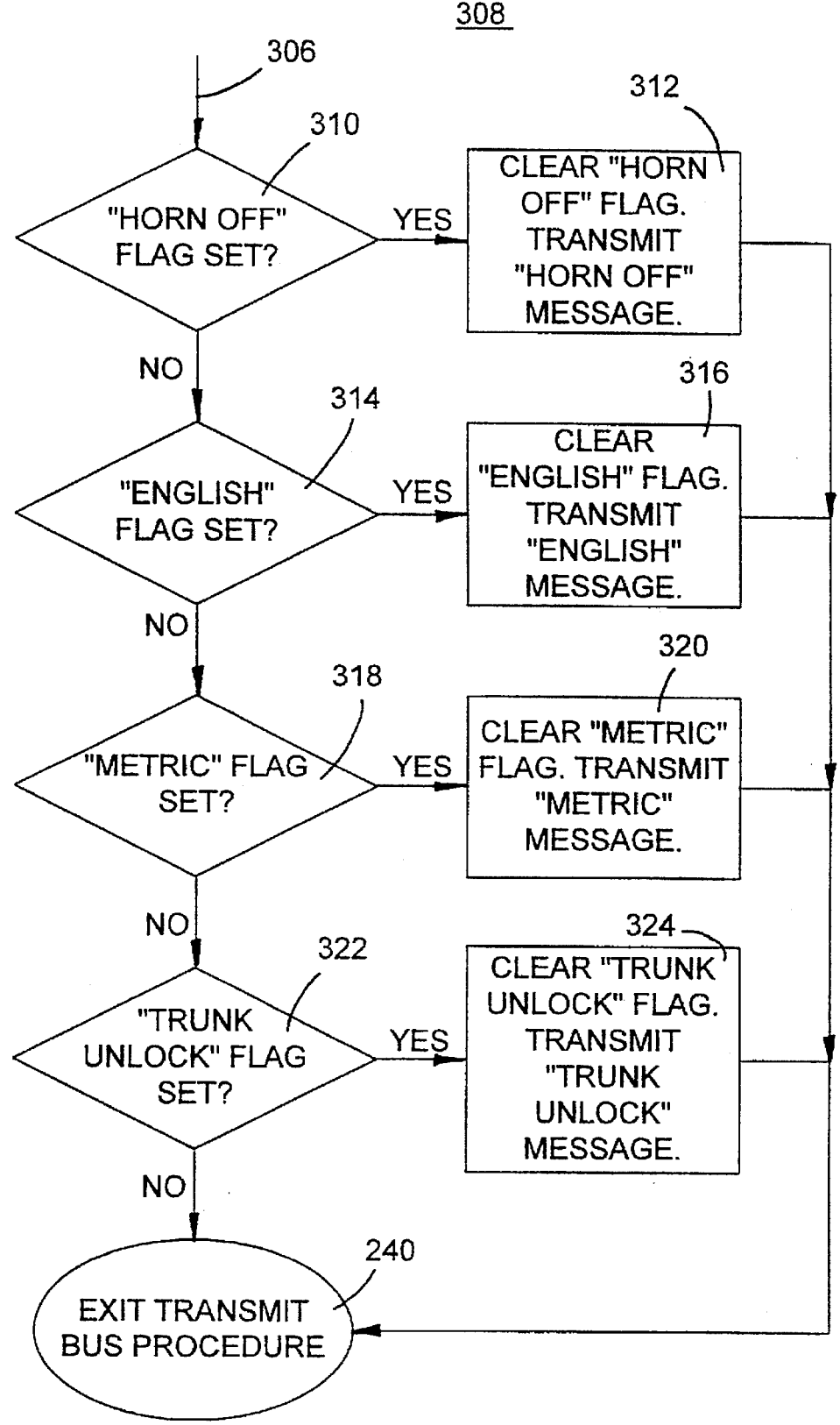

The TRANSMIT BUS CONT subroutine 308 is shown in FIG. 14. This subroutine is entered through input line 306 and begins with block 310 which determines if the "Horn Off" flag has been set. If the flag is set, the subroutine proceeds to block 312 which clears the flag and transmits a "Horn Off" message over the bus lines to deactivate the vehicle's horns. The program then returns to the EXAMINE BUS MESSAGES subroutine of FIG. 10 via block 240 which is the output line of the TRANSMIT BUS CONT subroutine. If block 310 determines that the "Horn Off" flag is not set, the program proceeds to block 314 which determines if the "English" flag has been set, indicating that a control switch 43 was pushed on the mid-level display requesting that all measurements be displayed in English units. If the flag is set, the program proceeds to block 316 which clears the flag and transmits an "English" message to the microprocessor, causing it to perform all calculations using English units. The program then returns to the EXAMINE BUS MESSAGES subroutine of FIG. 10 via block 240. If block 314 determines that the "English" flag is not set, the subroutine proceeds to block 318 which determines if the "Metric" flag has been set by means of a similar control switch. If the flag is set, block 320 clears the flag and transmits a "Metric" message to the microprocessor, causing it to perform all calculations using Metric units. The program then returns to the EXAMINE BUS MESSAGES subroutine of FIG. 10 via block 240. If block 318 determines that the "Metric" flag is not set, the subroutine proceeds to block 322 which determines if the "Trunk Unlock" flag has been set. If the flag is set, the subroutine proceeds to block 324 which clears the flag and transmits a "Trunk Unlock" message over the bus lines to unlock the vehicle's trunk. The program then returns to the EXAMINE BUS MESSAGES subroutine of FIG. 10 via block 240. If block 322 determines that the "Trunk Unlock" flag is not set, the program returns to FIG. 10 via block 240.

Figure 15:
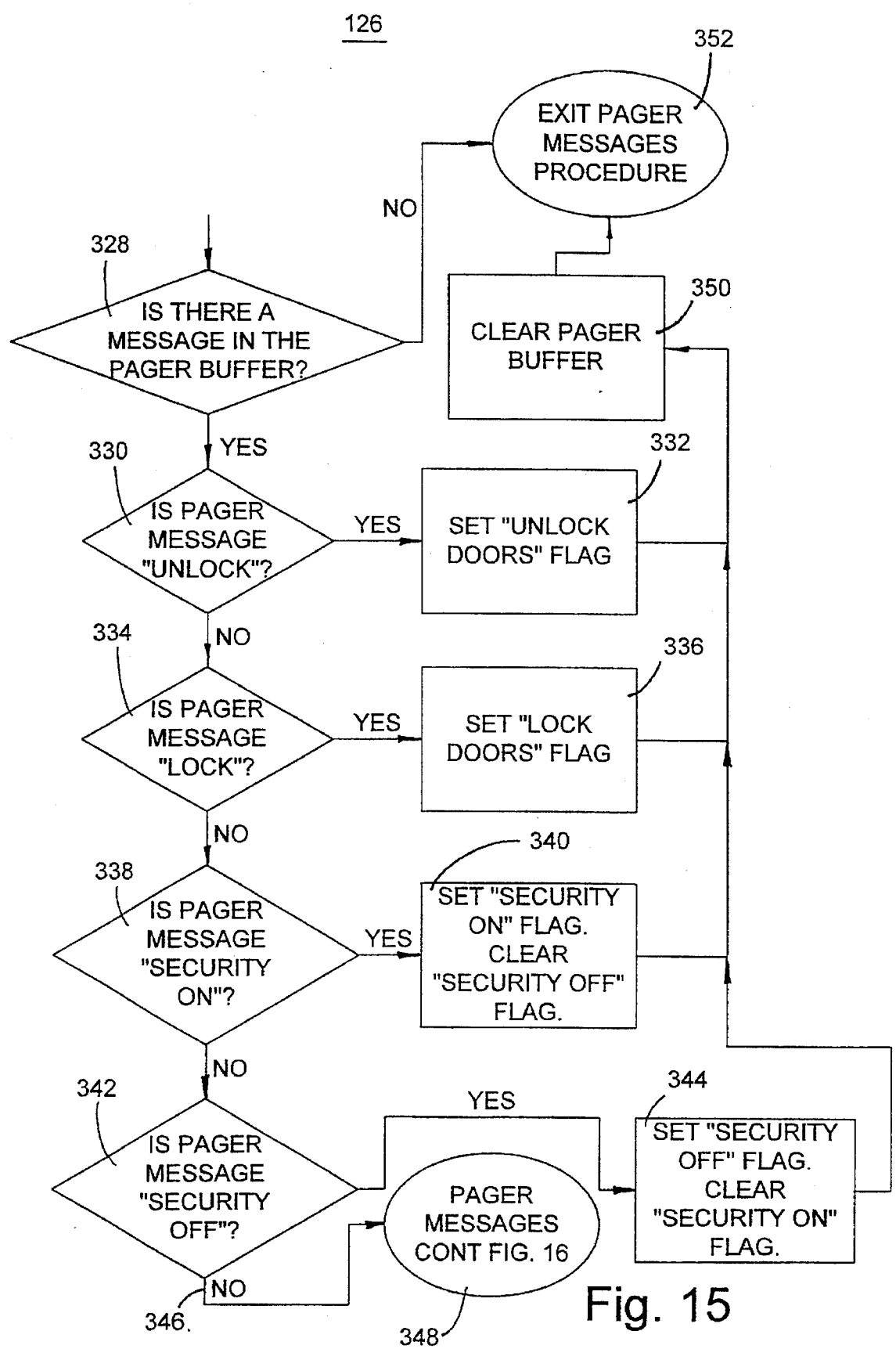

Referring to FIG. 15, the EXAMINE PAGER MESSAGES subroutine 126 is shown. This subroutine begins with block 328 which determines if there is a message in the pager buffer. If not, the subroutine is exited via block 352. If there is a message, the subroutine proceeds to block 330 which determines if the pager message is an "Unlock" message. If it is, the subroutine proceeds to block 332 which sets the "Unlock Doors" flag, and block 350 clears the pager buffer. The subroutine then exits via block 352. If block 330 determines that tire pager message is not an "Unlock" message, the subroutine proceeds to block 334 which determines if it is a "Lock" message. If it is, the subroutine proceeds to block 336 which sets the "Lock Doors" flag, and block 350 clears the pager buffer. The subroutine then exits via block 352. If block 334 determines that the pager message is not a "Lock" message, the subroutine proceeds to block 338 which determines if it is a "Security On" message. If it is, the subroutine proceeds to block 340 which sets the "Security On" flag and clears the "Security Off" flag. Block 350 then clears the pager buffer, and the subroutine exits via block 352. If block 338 determines that the pager message is not a "Security On" message, the subroutine proceeds to block 342 which determines if it is a "Security Off" message. If it is, the subroutine proceeds to block 344 which sets the "Security Off" flag and clears the "Security On" flag. Block 350 then clears the pager buffer, and the subroutine exits via block 352. If block 342 determines that the pager message is not a "Security Off" message, the program proceeds through input line 346 to the PAGER MESSAGES CONT subroutine 348, now described.

Figure 16:
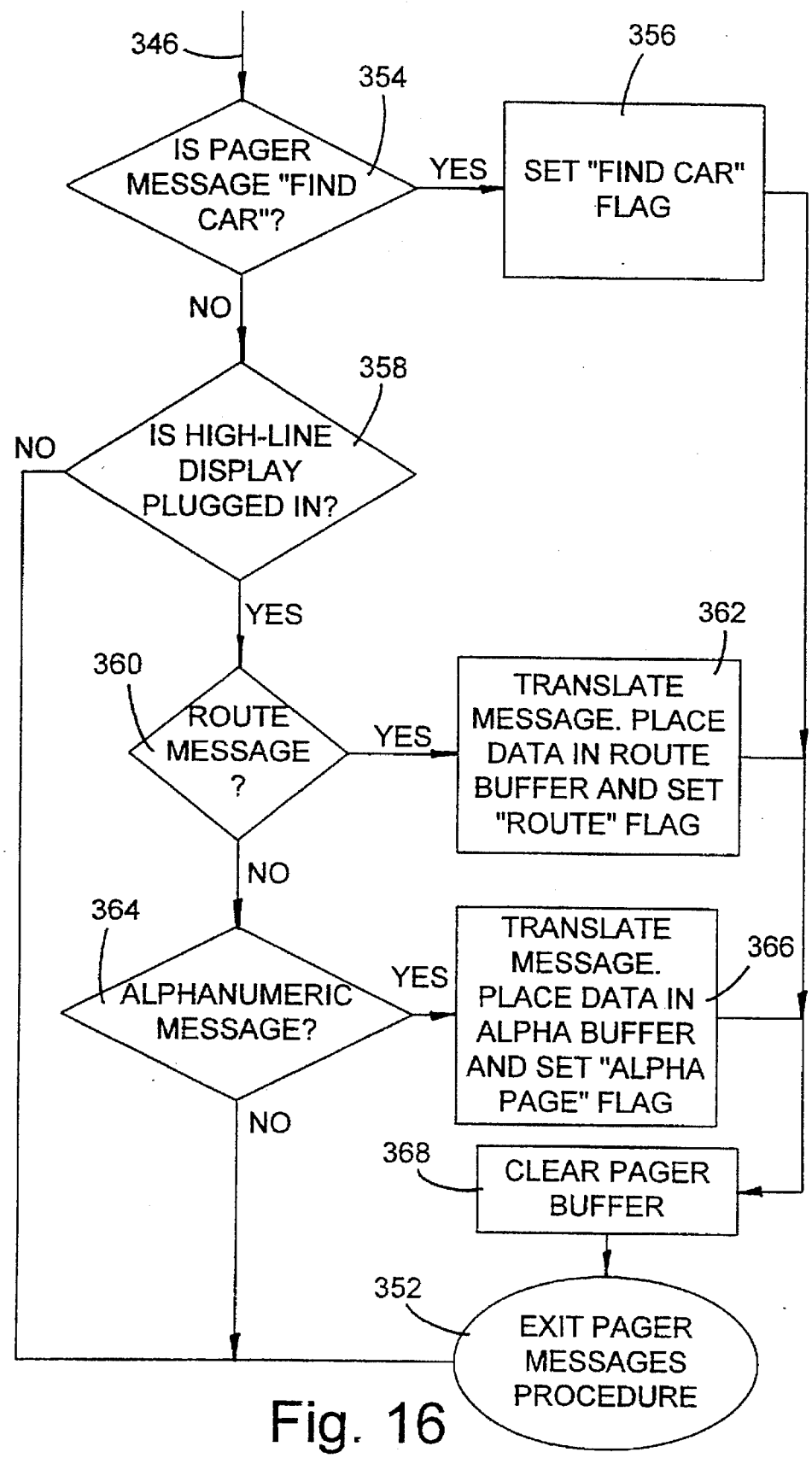

The PAGER MESSAGES CONT subroutine 348 is shown in FIG. 16. The subroutine is entered through input line 346 and begins with block 354 which determines if the pager message is a "Find Car" message. If it is, the subroutine proceeds to block 356 which sets the "Find Car" flag. Block 368 then clears the pager buffer, and the subroutine exits via block 352. If block 354 determines that The pager message is not a "Find Car" message, then the message may be either a route message or an alpha-numeric message which is capable of display only on the high-level display 82. In this embodiment, the microprocessor determines in block 358 if the high-level display is in use and, if not, the subroutine exits via block 352. If the high-level display is in use, the subroutine proceeds to block 360 which determines if the pager message is a route message that is transmitted by a navigation service. The microprocessor can identify these messages because they are usually indicated by an identifying prefatory signal. If it is a route message, the subroutine proceeds to block 362 wherein the microprocessor translates the message, places the data in the microprocessor's route buffer, and sets the "Route" flag. Next, block 368 clears the pager buffer and the subroutine exits via block 352. If block 360 determines that the pager message is not a route message, block 364 determines if it is an alpha-numeric message. If it is, the subroutine proceeds to block 366 wherein the microprocessor translates the message, places the data in the microprocessor's alpha buffer, and sets the "Alpha Page" flag. Block 368 then clears the pager buffer, and the subroutine exits via block 352. If block 364 determines that the pager message is not an alpha-numeric message, the subroutine exits via block 352.

Figure 17:
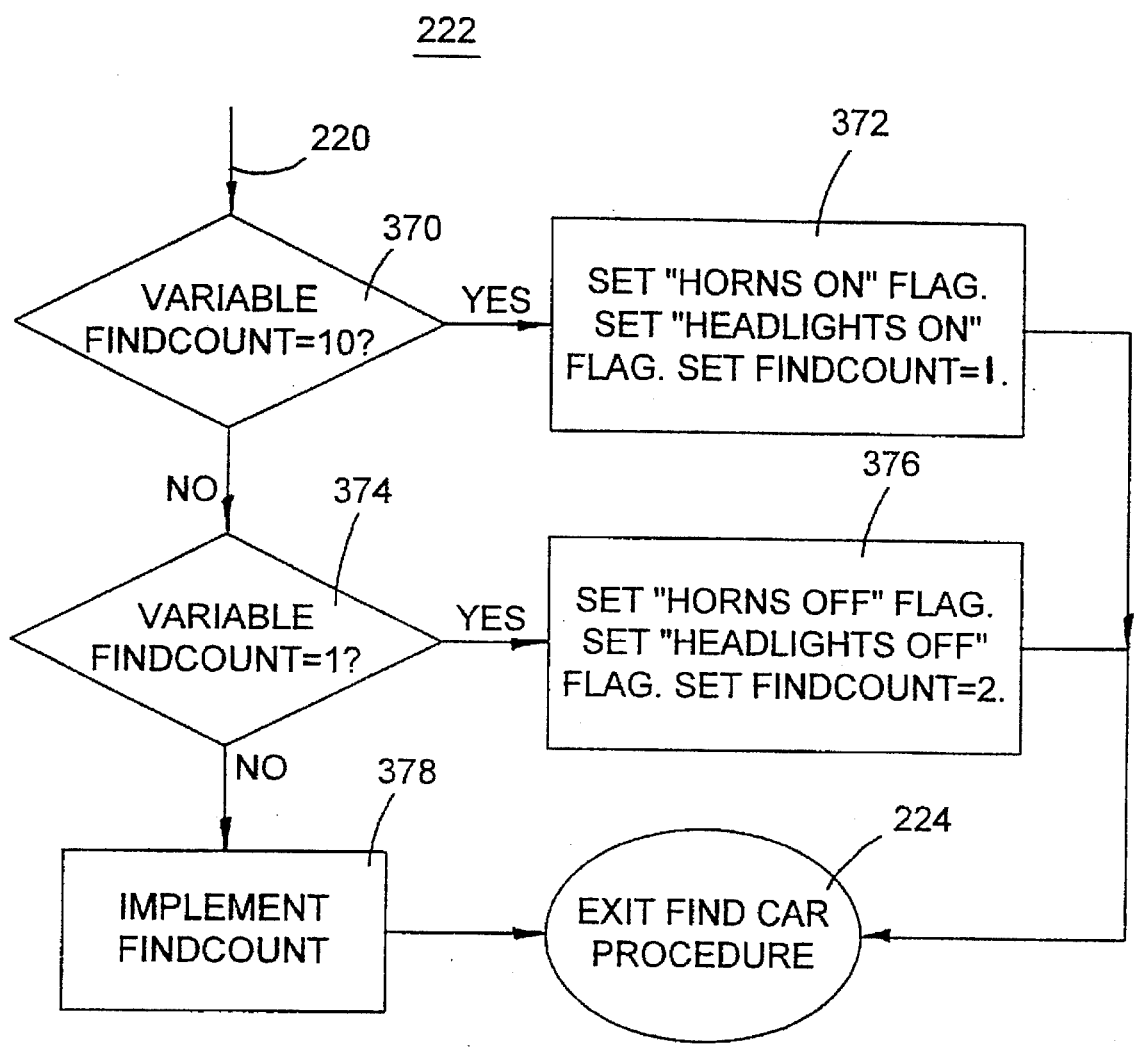

Referring to FIG. 17, the FIND CAR PROCEDURE subroutine 222 is shown. The subroutine is entered through input line 220 and begins with block 370 which determines whether a variable "Findcount" is equal to 10. If it is, block 372 sets the "Horns on" and "Headlight on" flags and sets variable "Findcount" equal to 1. The program then returns to the ½ SECOND PROCEDURE subroutine of FIG. 9 via block 224 which is the output line of the FIND CAR PROCEDURE subroutine. If block 370 determines that variable "Findcount" is not equal to 10, the subroutine proceeds to block 374 which determines if it is equal to 1. If it is, the subroutine proceeds to block 376 wherein the "Horns off" and "Headlight off" flags are set and variable "Findcount" is set equal to 2. The program then returns to the ½ SECOND PROCEDURE subroutine of FIG. 9 via block 224. If block 374 determines that variable "Findcount" is not equal to 1, then block 378 increments variable "Findcount", and the program returns to the ½ SECOND PROCEDURE subroutine of FIG. 9 via block 224. In operation, this subroutine sets flags which, as described below, cause the vehicle's horns and headlights to be operated approximately every five seconds, thus helping a vehicle's owner locate his or her vehicle.

Figure 18:
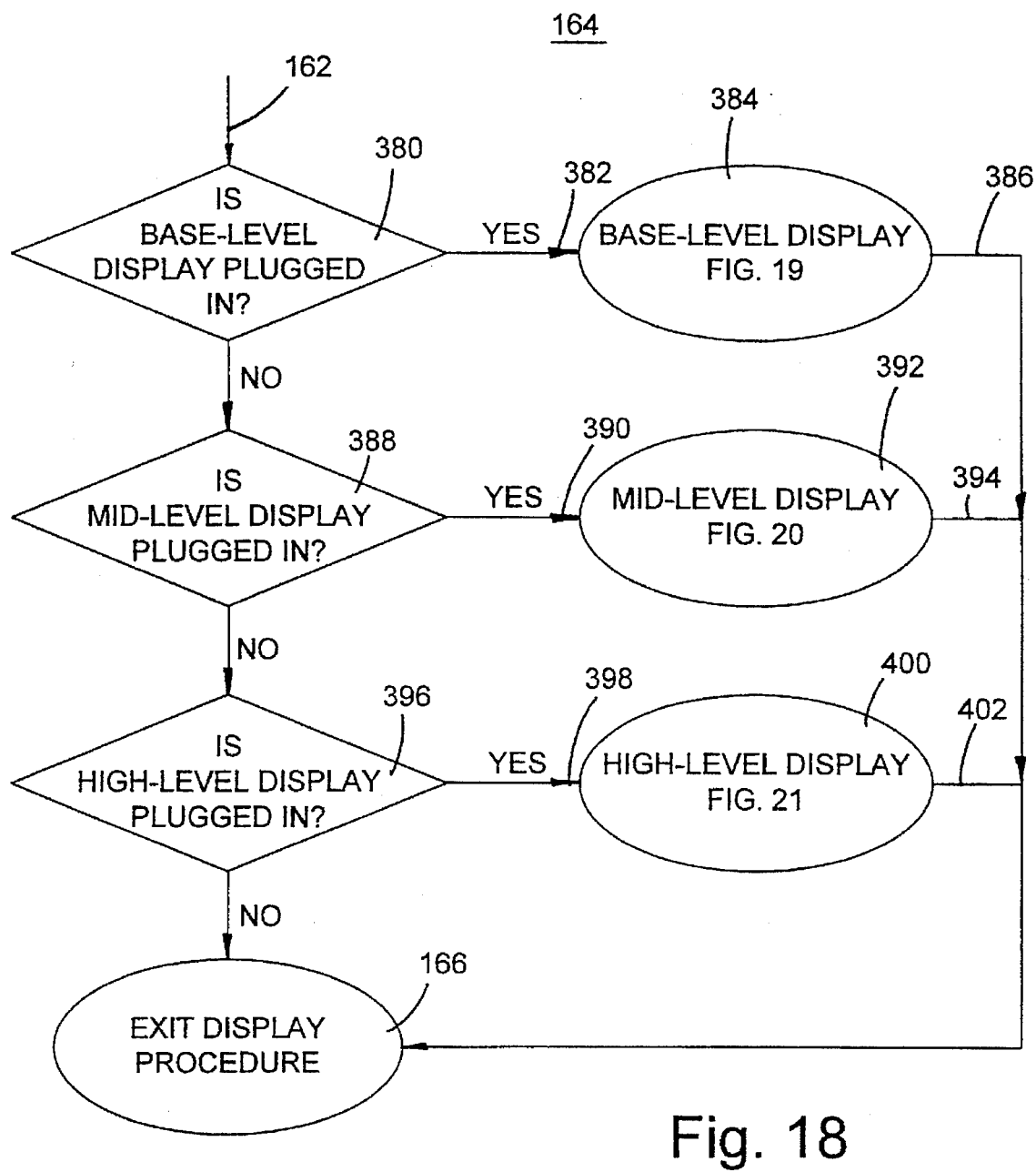

The DISPLAY PROCEDURES subroutine 164 is shown in FIG. 18. This subroutine determines whether the lower-level, mid-level, or high-level display is in use. As mentioned previously, the microprocessor can determine which, if any, of these displays is in use by examining which of the three microprocessor's display input lines are grounded. The subroutine is entered through input line 162 and begins with block 380 which determines if the base or lower-level display is in use. If it is, the program proceeds through input line 382 to the BASE LEVEL DISPLAY subroutine 384, described in greater detail below in connection with FIG. 19. Upon return from the BASE LEVEL DISPLAY subroutine through output line 386, the program returns to the TIMING LOOP subroutine of FIG. 8 via block 166 which is the output line of the DISPLAY PROCEDURES subroutine. If block 380 determines that the base-level display is not in use, then block 388 determines if the mid-level display is in use. If it is, the program proceeds through input line 390 to the MID-LEVEL DISPLAY subroutine 392, described in greater detail below in connection with FIG. 20. Upon return from the MID-LEVEL DISPLAY subroutine through output line 394, the program returns to the TIMING LOOP subroutine of FIG. 8 via block 166. If block 388 determines that the mid-level display is not in use, then block 396 determines if the high-level display is in use. If it is, then the program proceeds through input line 398 to the HIGH-LEVEL DISPLAY subroutine 400, described in greater detail below in connection with FIG. 21. Upon return from the HIGH-LEVEL DISPLAY subroutine through output line 402, the program returns to the TIMING LOOP subroutine of FIG. 8 via block 166. If block 396 determines that the high-level display is not in use, then none of the above-mentioned displays are electrically coupled to the microprocessor, and the program returns to the TIMING LOOP subroutine of FIG. 8 via block 166. A description of each of the display subroutines now follows.

Figure 19:
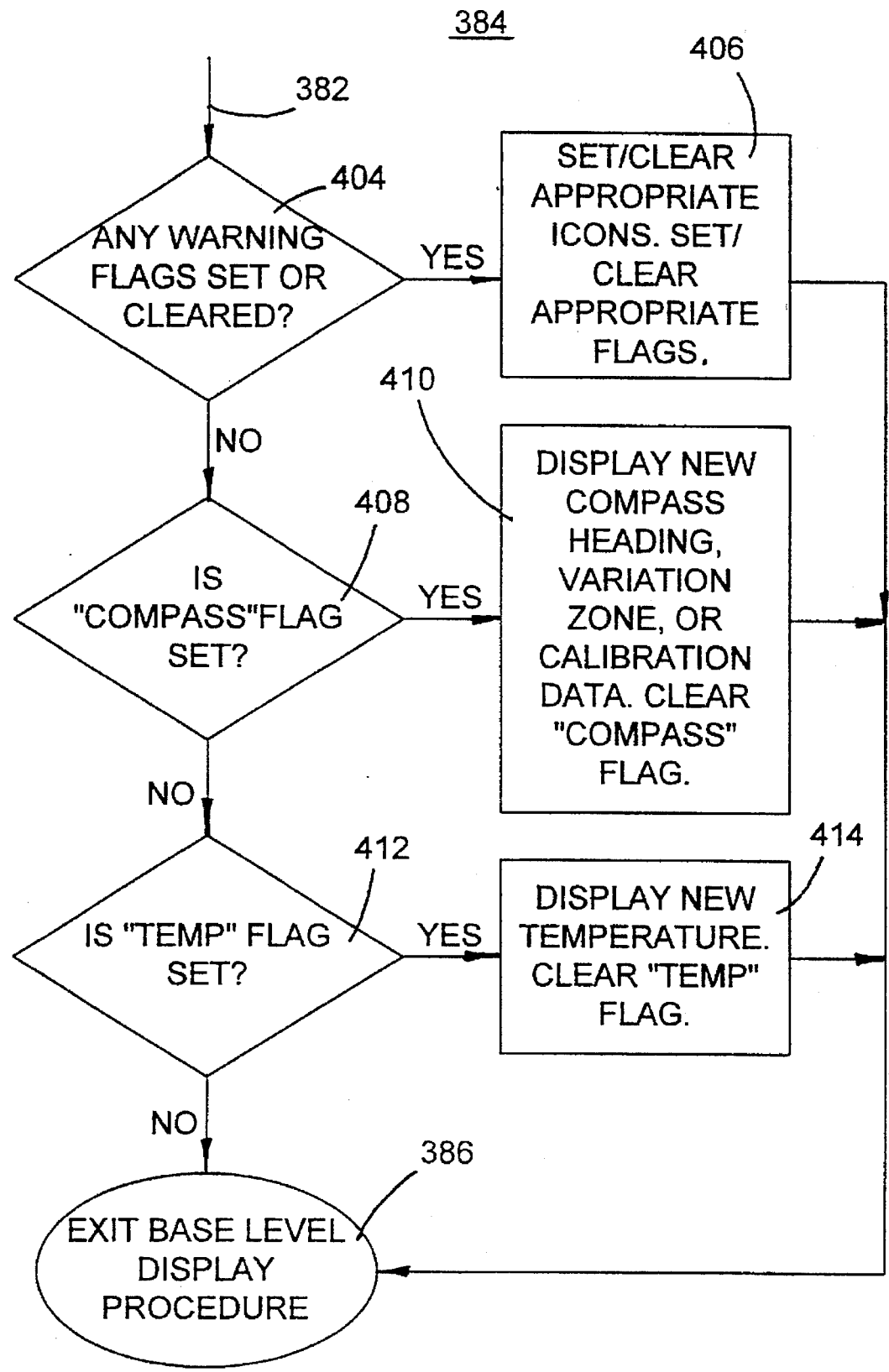

FIG. 19 shows the BASE LEVEL DISPLAY subroutine 384. This subroutine is entered through input line 382 and begins with block 404 which determines if any of the warning flags were set or cleared in the ANALYZE MESSAGE RECEIVED subroutine 230 of FIG. 11. If they were, the program proceeds to block 406 which sets or clears the appropriate LED icons on The display and sets or clears the appropriate flags. The program then returns to the DISPLAY PROCEDURES subroutine of FIG. 18 via block 386 which is the output line of the BASE LEVEL DISPLAY subroutine. If block 404 determines that no warning flags were set or cleared, then block 408 determines if the "Compass" flag is set, indicating that new information relating to the compass was received. If the flag is set, the subroutine proceeds to block 410 wherein the new compass heading, variation zone information (relating to one of the fifteen different magnetic field zones of the country), or calibration data is displayed, and the "Compass" flag is cleared. The program then returns to the DISPLAY PROCEDURES subroutine of FIG. 18 via block 386. If block 408 determines that the "Compass" flag is not set, then block 412 determines if the "Temp" flag is set. If it is, then the subroutine proceeds to block 414 which displays the new temperature and clears the "Temp" flag. The program then returns to the DISPLAY PROCEDURES subroutine of FIG. 18 via block 386. If block 412 determines that the "Temp" flag is not set, then the program returns to FIG. 18 via block 386.

Figure 20:
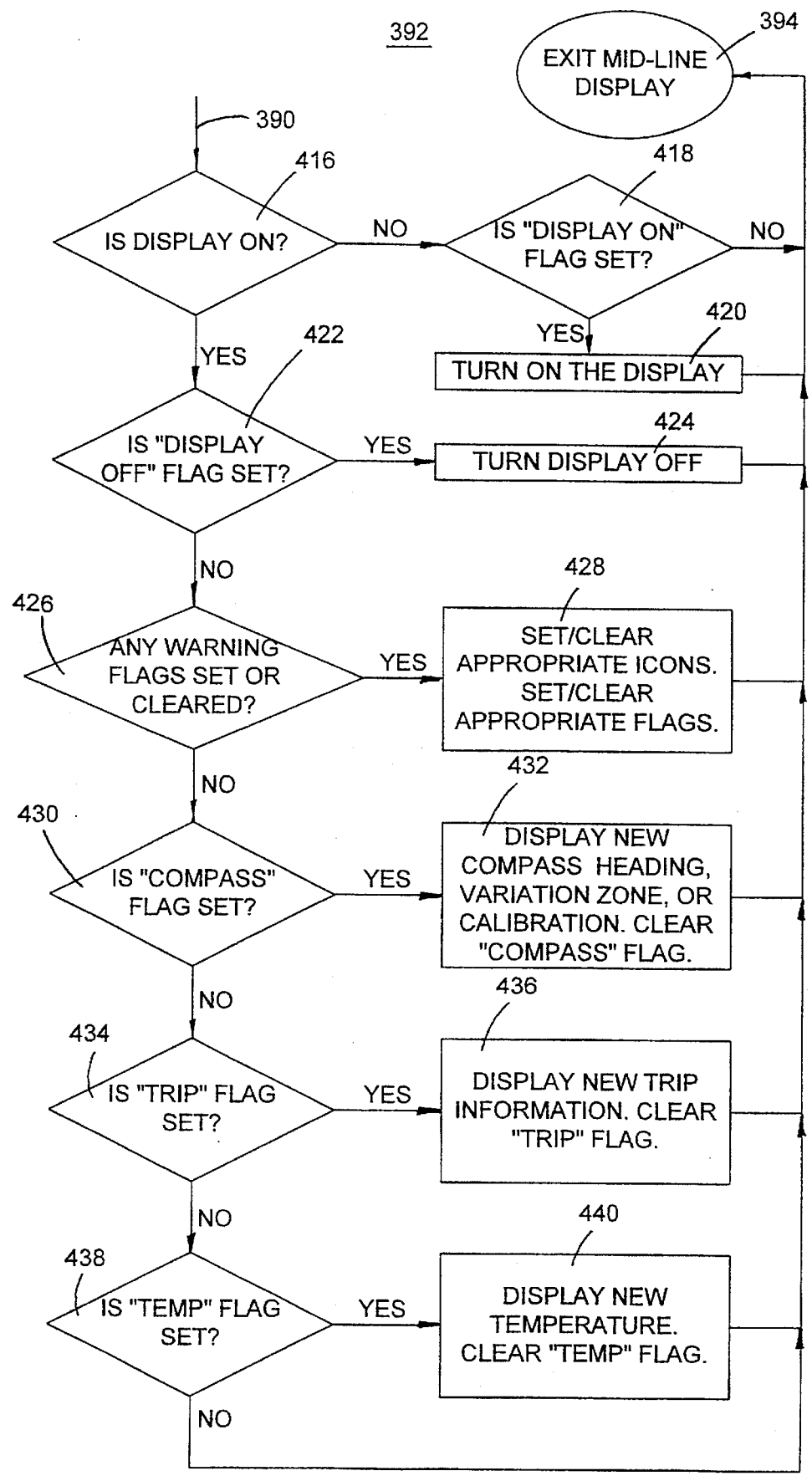

Referring to FIG. 20, the MID-LEVEL DISPLAY subroutine 392 is shown. This subroutine is entered through input line 390 and begins with block 416 which determines if the display is on or off. If the display is off, the subroutine proceeds to block 418 which determines if the "Display on" flag is set, and, if it is, block 420 turns on the display. After block 420, or if block 418 determines that the "Display on" flag is not set, the program returns to the DISPLAY PROCEDURES subroutine of FIG. 18 via block 394 which is the output line of the MID-LEVEL DISPLAY subroutine. If block 416 determines that the display is on, block 422 determines if the "Display off" flag is set. If it is, block 424 turns the display off, and the program returns to the DISPLAY PROCEDURES subroutine of FIG. 18 via block 394. If block 422 determines that the "Display off" flag is not set, block 426 determines if any warning flags are set or cleared. If they are, block 428 sets or clears the appropriate LED icons on the display and sets or clears the appropriate flags. The program then returns to the DISPLAY PROCEDURES subroutine of FIG. 18 via block 394. If block 426 determines that no warning flags are set or cleared, block 430 determines if the "Compass" flag is set. If it is, block 432 displays the new compass beading, variation zone information, or calibration data, and clears the "Compass" flag. The program then returns to the DISPLAY PROCEDURES subroutine of FIG. 18 via block 394. If block 430 determines that the "Compass" flag is not set, block 434 determines if the "Trip" flag is set indicating that the trip information needs to be updated. If it is, block 436 displays the new trip information and clears the "Trip" flag. The program then returns to the DISPLAY PROCEDURES subroutine of FIG. 18 via block 394. If block 434 determines that the "Trip" flag is not set, the subroutine proceeds to block 438 which determines if the "Temp" flag is set. If it is, then block 440 displays the new temperature and clears the "Temp" flag. After block 440, or if block 438 determines that the "Temp" flag is not set, the program returns to the DISPLAY PROCEDURES subroutine of FIG. 18 via block 394.

Figure 21:
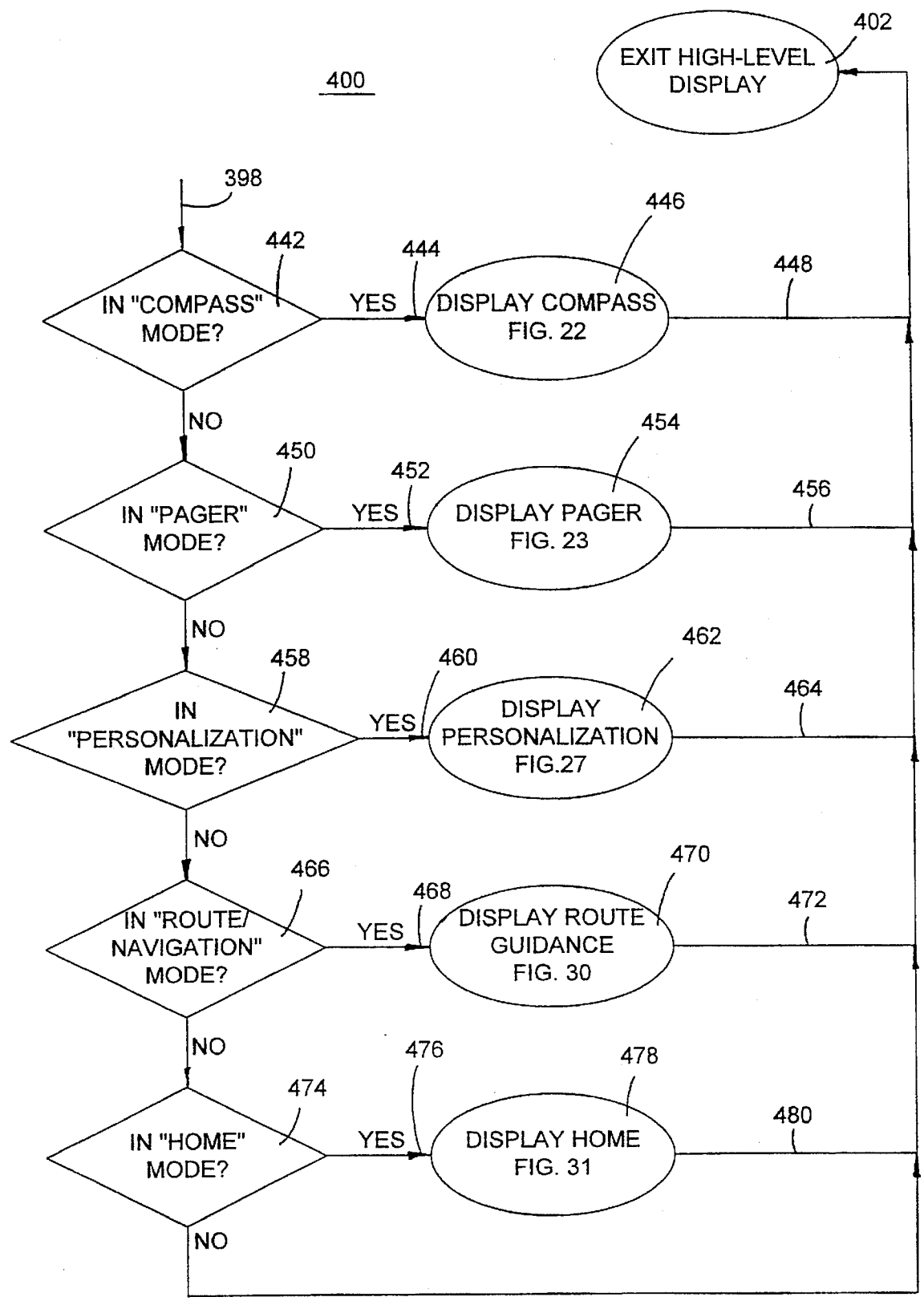

FIG. 21 shows the HIGH-LEVEL DISPLAY subroutine 400. This subroutine is entered through input line 398 and begins with block 442 which determines if the display is in the "Compass" mode. If it is, then the program proceeds through input line 444 to the DISPLAY COMPASS subroutine 446, described in greater detail below in connection with FIG. 22. Upon return from the DISPLAY COMPASS subroutine through output line 448, the program returns to the DISPLAY PROCEDURES subroutine of FIG. 18 via block 402 which is the output line of the HIGH-LEVEL DISPLAY subroutine. If block 442 determines that the display is not in the "Compass" mode, then block 450 determines if it is in the "Pager" mode. If it is, then the program proceeds through input line 452 to the DISPLAY PAGER subroutine 454, described in greater detail below in connection with FIG. 23. Upon return from the DISPLAY PAGER subroutine through output line 456, the program returns to the DISPLAY PROCEDURES subroutine of FIG. 18 via block 402. If block 450 determines that the display is not in the "Pager" mode, then block 458 determines if it is in the "Personalization" mode. If it is, the program proceeds through input line 460 to the DISPLAY PERSONALIZATION subroutine 462, described in greater detail below in connection with FIG. 27. Upon return from the DISPLAY PERSONALIZATION subroutine through output line 464, the program returns to the DISPLAY PROCEDURES subroutine of FIG. 18 via block 402. If block 458 determines that the display is not in the "Personalization" mode, then block 466 determines if it is in the "Route/Navigation" mode. If it is, then the program proceeds through input line 468 to the DISPLAY ROUTE GUIDANCE subroutine 470, described in greater detail below in connection with FIG. 30. Upon return from the DISPLAY ROUTE GUIDANCE subroutine through output line 472, the program returns to the DISPLAY PROCEDURES subroutine of FIG. 18 via block 402. If block 466 determines that the display is not in the "Route/Navigation" mode, then block 474 determines if it is in the "Home" mode. If it is, then the program proceeds through input line 476 to the DISPLAY HOME subroutine 478, described in greater detail below in connection with FIG. 31. Upon return from the DISPLAY HOME subroutine through output line 480, or if block 474 determines that the display is not in the "Home" mode, the program returns to the DISPLAY PROCEDURES subroutine of FIG. 18 via block 402.

Figure 22:
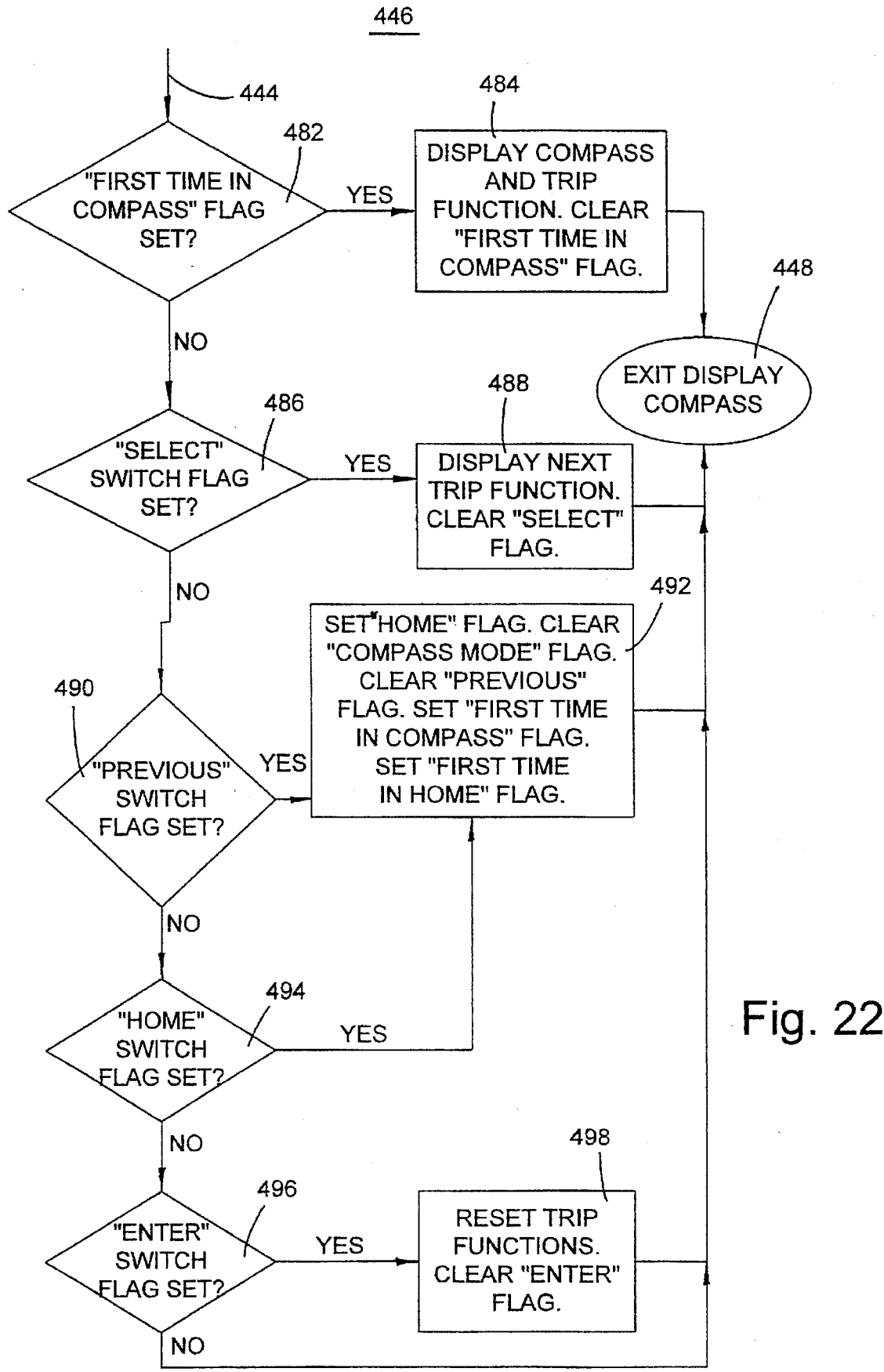

Referring to FIG. 22, THE DISPLAY COMPASS subroutine 446 is shown. The subroutine is entered through input line 444 and begins with block 482 which determines if the "First time in Compass" flag is set. If it is, then block 484 displays the compass and trip function, and clears the "First time in Compass" flag. The program then returns to the HIGH-LEVEL DISPLAY subroutine of FIG. 21 via block 448 which is the output line of the DISPLAY COMPASS subroutine. If block 482 determines that the "First time in Compass" flag is not set, then block 486 determines if the "Select" switch flag is set. If it is, then block 488 displays the next trip function and clears the "Select" flag. The program then returns to the HIGH-LEVEL DISPLAY subroutine of FIG. 21 via block 448. If block 486 determines that the "Select" switch flag is not set, then block 490 determines if the "Previous" switch flag is set. If it is, then block 492 sets the "Home", "First time in Compass", and "First time in Home" flags, and clears the "Compass Mode" and "Previous" flags. The program then returns to the HIGH-LEVEL DISPLAY subroutine of FIG. 21 via block 448. If block 490 determines that the "Previous" switch flag is not set, then block 494 determines if the "Home" switch flag is set. If it is, then the program proceeds to block 492 (described above), and returns to the HIGH-LEVEL DISPLAY subroutine of FIG. 21 via block 448. If block 494 determines that the "Home" switch flag is not set, then block 496 determines if the "Enter" switch flag is set. If it is, then block 498 resets the trip functions and clears the "Enter" flag. After block 498, or if block 496 determines that the "Enter" switch flag is not set, the program returns to the HIGH-LEVEL DISPLAY subroutine of FIG. 21 via block 448.

Figure 23:
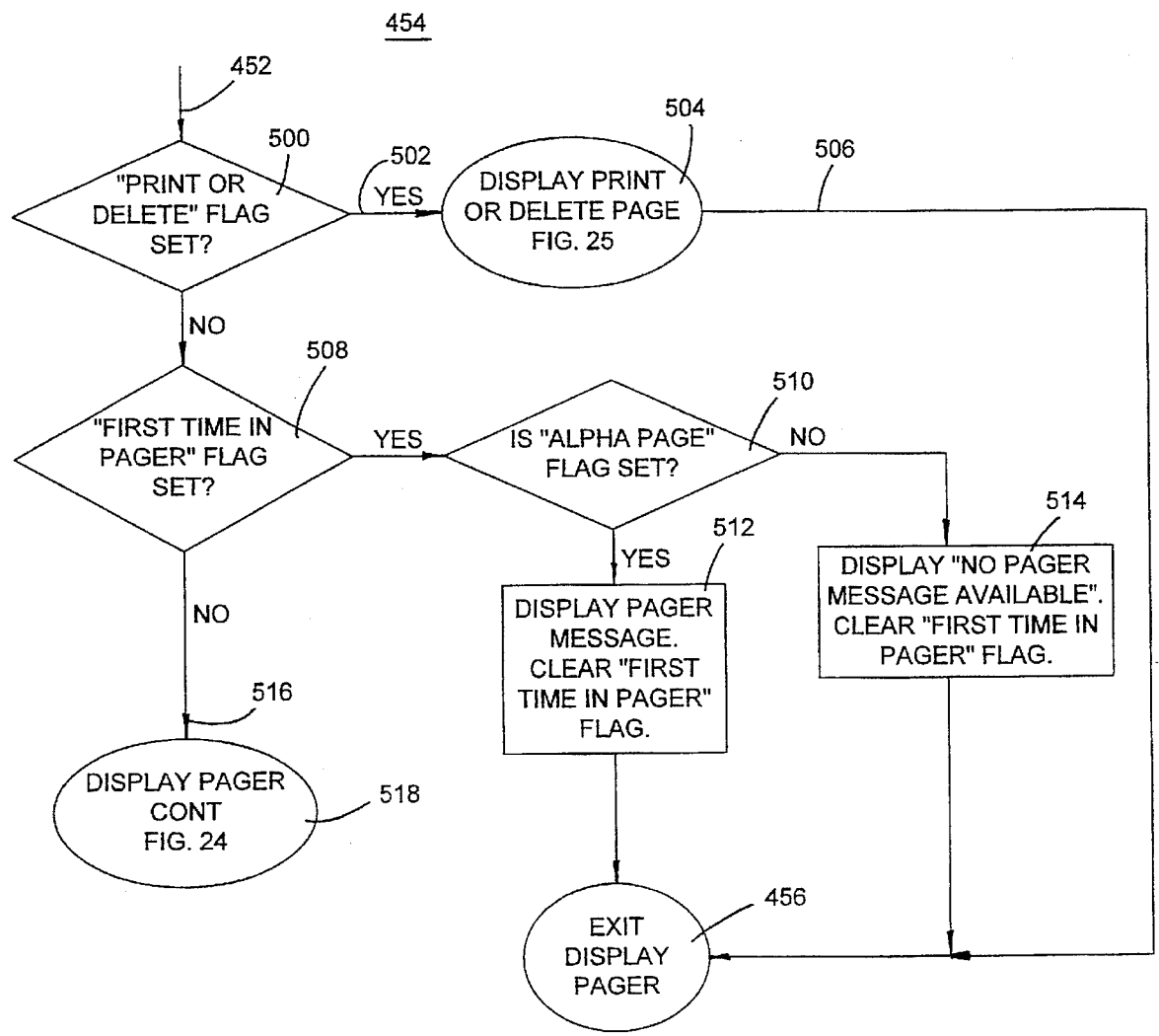

The DISPLAY PAGER subroutine 454 is shown in FIG. 23. This subroutine is entered through input line 452 and begins with block 500 which determines if the "Print or Delete" flag is set. If it is, then the program proceeds through input line 502 to the DISPLAY PRINT OR DELETE PAGE subroutine 504, described in greater detail below in connection with FIG. 25. Upon return from the DISPLAY PRINT OR DELETE PAGE subroutine through output line 506, the program returns to the HIGH-LEVEL DISPLAY subroutine of FIG. 21 via block 456 which is the output line of the DISPLAY PAGER subroutine. If block 500 determines that the "Print or Delete" flag is not set, then block 508 determines if the "First time in Pager" flag is set. If it is, then block 510 determines if the "Alpha Page" flag is set, and, if it is, block 512 displays the pager message and clears the "First time in Pager" flag. The program then returns to the HIGH-LEVEL DISPLAY subroutine of FIG. 21 via block 456. If block 510 determines that the "Alpha Page" flag is not set, then block 514 displays a "No Pager Message Available" message and clears the "First time in Pager" flag. The program then returns to the HIGH-LEVEL DISPLAY subroutine of FIG. 21 via block 456. If block 508 determines that the "First time in Pager" flag is not set, the program proceeds through input line 516 to the DISPLAY PAGER CONT subroutine 518, now described.

Figure 24:
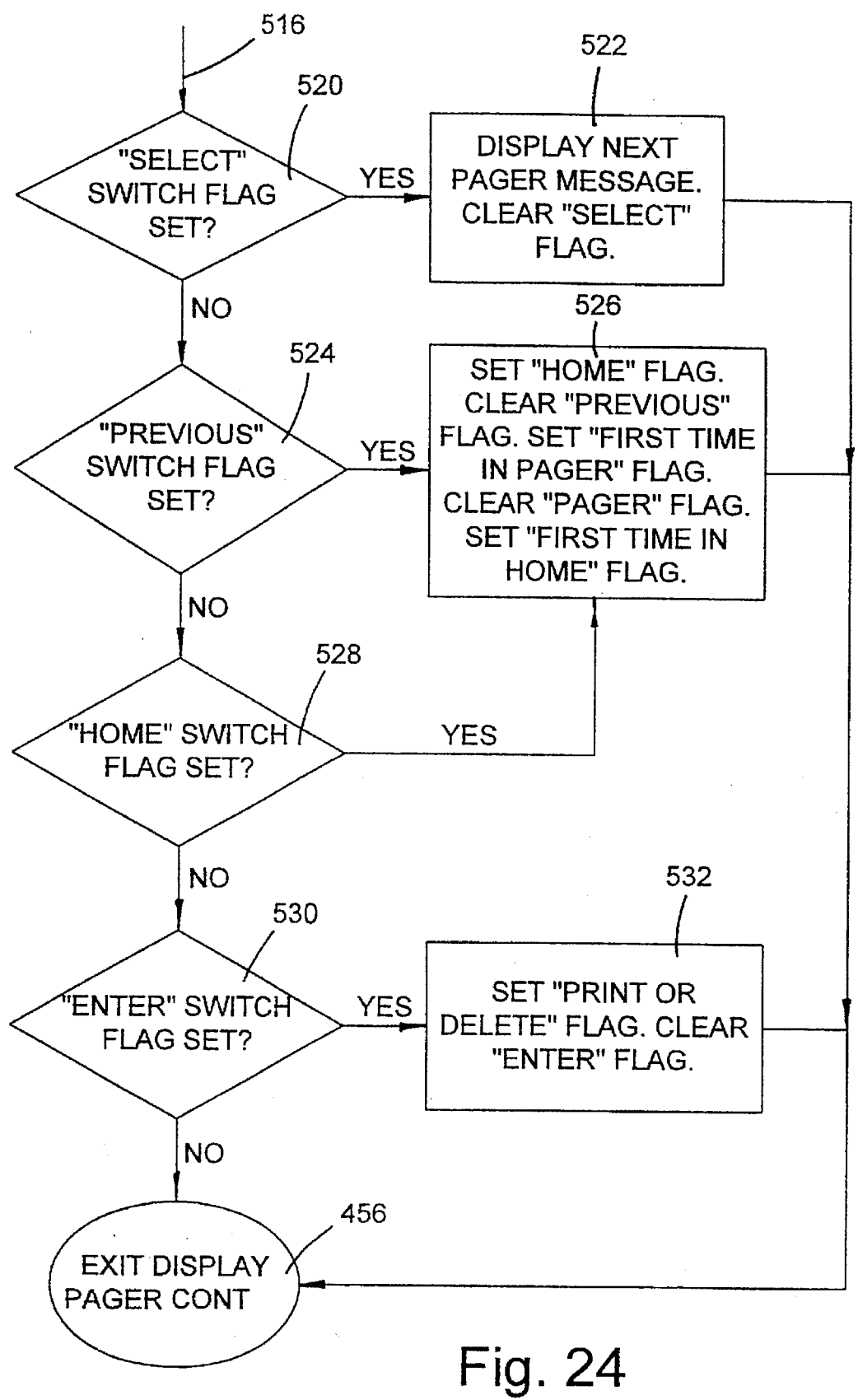

Referring to FIG. 24, the DISPLAY PAGER CONT subroutine 518 is shown. This subroutine is entered through input line 516 and begins with block 520 which determines if the "Select" switch flag is set. If it is, then block 522 displays the next pager message and clears the "Select" flag. The program then returns to the HIGH-LEVEL DISPLAY subroutine of FIG. 21 via block 456 which is the output line of the DISPLAY PAGER CONT subroutine. If block 520 determines that the "Select" switch flag is not set, then block 524 determines if the "Previous" switch flag is set. If it is, then block 526 sets the "Home", "First time in Pager", and "First time in Home" flags, and clears the "Previous" and "Pager" flags. The program then returns to the HIGH-LEVEL DISPLAY subroutine of FIG. 21 via block 456. If block 524 determines that the "Previous" switch flag is not set, then block 528 determines if the "Home" switch flag is set. If it is, the program proceeds to block 526 (described above), and returns to the HIGH-LEVEL DISPLAY subroutine of FIG. 21 via block 456. If block 528 determines that the "Home" switch flag is not set, then block 530 determines if the "Enter" switch flag is set. If it is, then block 532 sets the "Print or Delete" flag and clears the "Enter" flag. After block 532, or if block 530 determines that the "Enter" switch flag is not set, the program returns to the HIGH-LEVEL DISPLAY subroutine of FIG. 21 via block 456.

Figure 25:
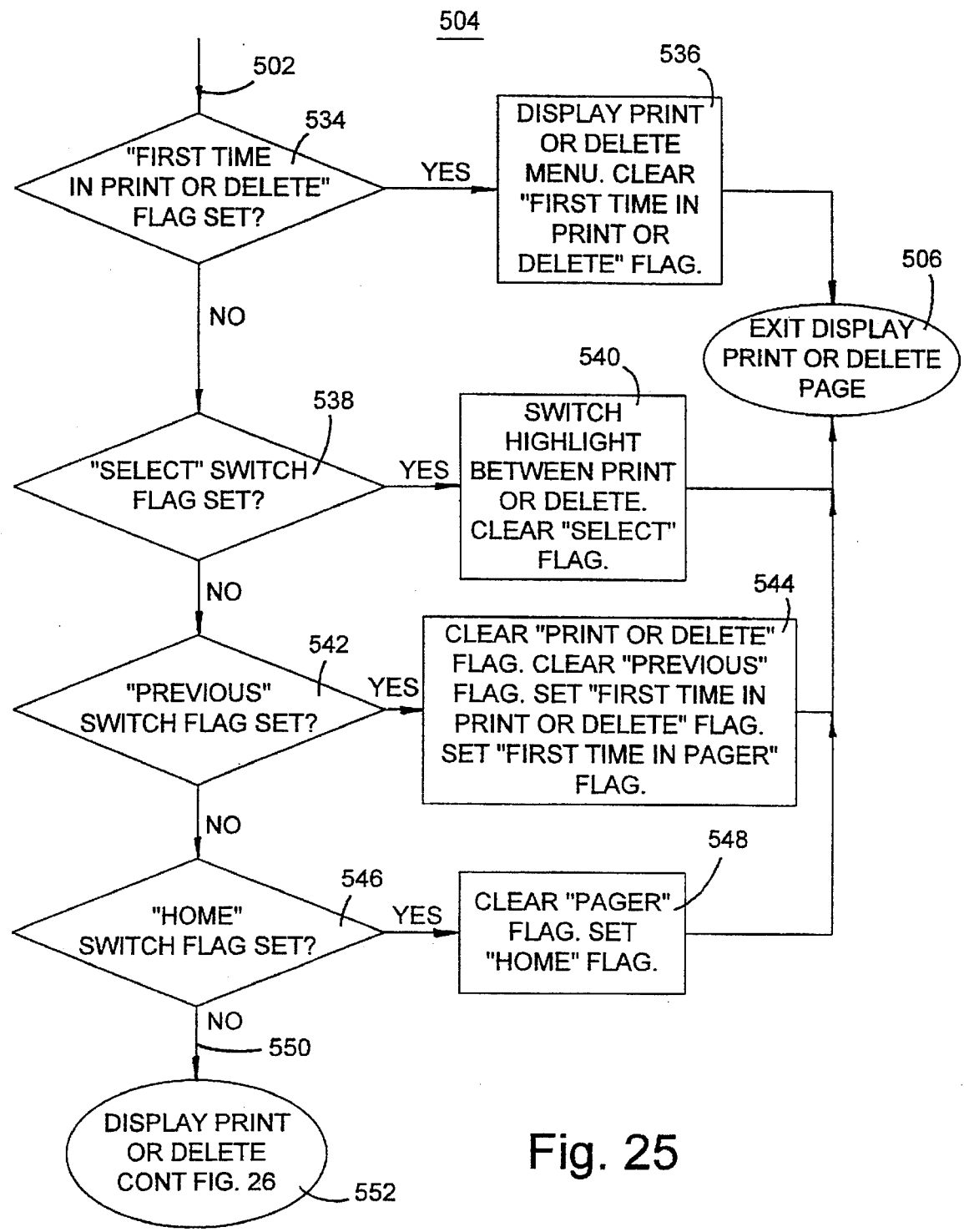

Referring to FIG. 25, the DISPLAY PRINT OR DELETE PAGE subroutine 504 is shown. This subroutine is entered through input line 502 and begins with block 534 which determines if the "First time in Print or Delete" flag is set. If it is, then block 536 displays the Print or Delete menu and clears the "First time in Print or Delete" flag. The program then returns to the DISPLAY PAGER subroutine of FIG. 23 via block 506 which is the output line of the DISPLAY PRINT OR DELETE PAGE subroutine. If block 534 determines that the "First time in Print or Delete" flag is not set, then block 538 determines if the "Select" switch flag is set. If it is, then block 540 switches the highlight on the Print or Delete menu between "Print" and "Delete", and clears the "Select" flag. The program then returns to the DISPLAY PAGER subroutine of FIG. 23 via block 506. If block 538 determines that the "Select" switch flag is not set, then block 542 determines if the "Previous" switch flag is set. If it is, then block 544 clears the "Print or Delete" and "Previous" flags, and sets the "First time in Print or Delete" and "First time in Pager" flags. The program then returns to the DISPLAY PAGER subroutine of FIG. 23 via block 506. If block 542 determines that the "Previous" switch flag is not set, then block 546 determines if the "Home" switch flag is set. If it is, then block 548 clears the "Pager" flag and sets the "Home" flag. The program then returns to the DISPLAY PAGER subroutine of FIG. 23 via block 506. If block 546 determines that the "Home" switch flag is not set, the program proceeds through input line 550 to the DISPLAY PRINT OR DELETE CONT subroutine 552, now described.

Figure 26:
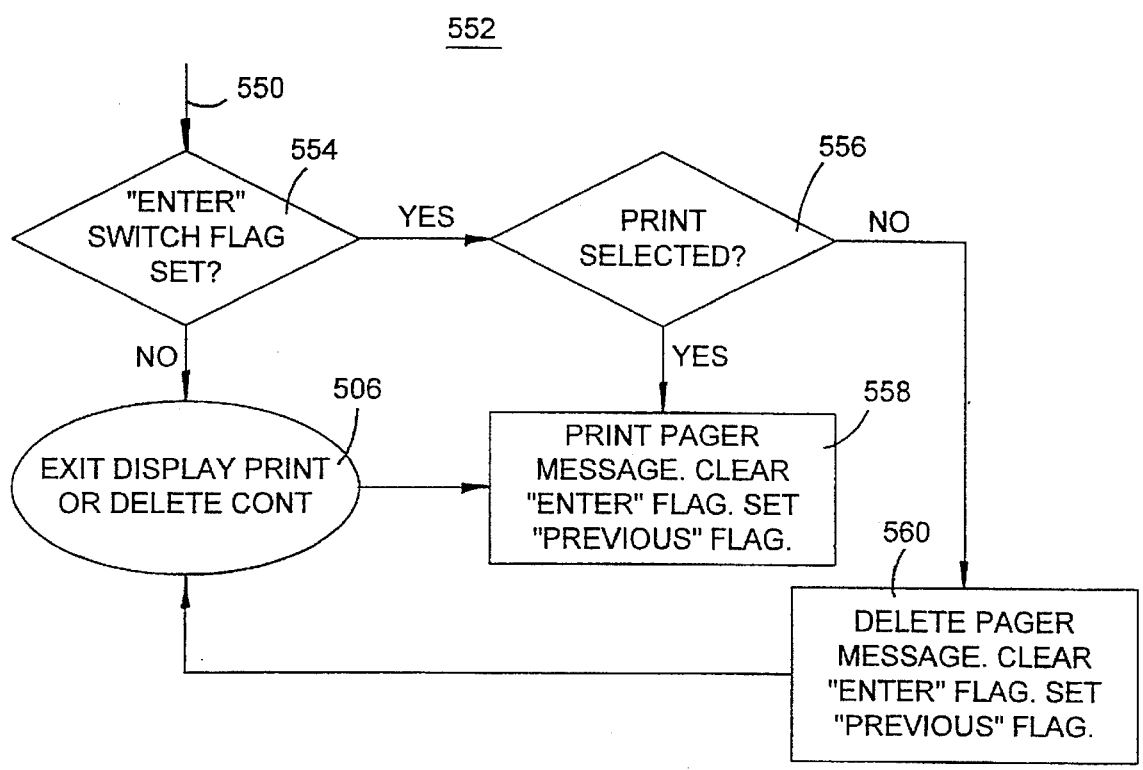

The DISPLAY PRINT OR DELETE CONT subroutine 552 is shown in FIG. 26. This subroutine is entered through input line 550 and begins with block 554 which determines if the "Enter" switch flag is set. If it is, then block 556 determines if the "Print" option is selected, and, if it is, block 558 prints the pager message, clears the "Enter" flag, and sets the "Previous" flag. The program then returns to the DISPLAY PAGER subroutine of FIG. 23 via block 506 which is the output line of the DISPLAY PRINT OR DELETE CONT subroutine. If block 556 determines that the "Print" option is not selected, then block 560 deletes the pager message, clears the "Enter" flag, and sets the "Previous" flag. The program then returns to the DISPLAY PAGER subroutine of FIG. 23 via block 506. If block 554 determines that the "Enter" switch flag is not set, then the program returns to FIG. 23 via block 506.

Figure 27:
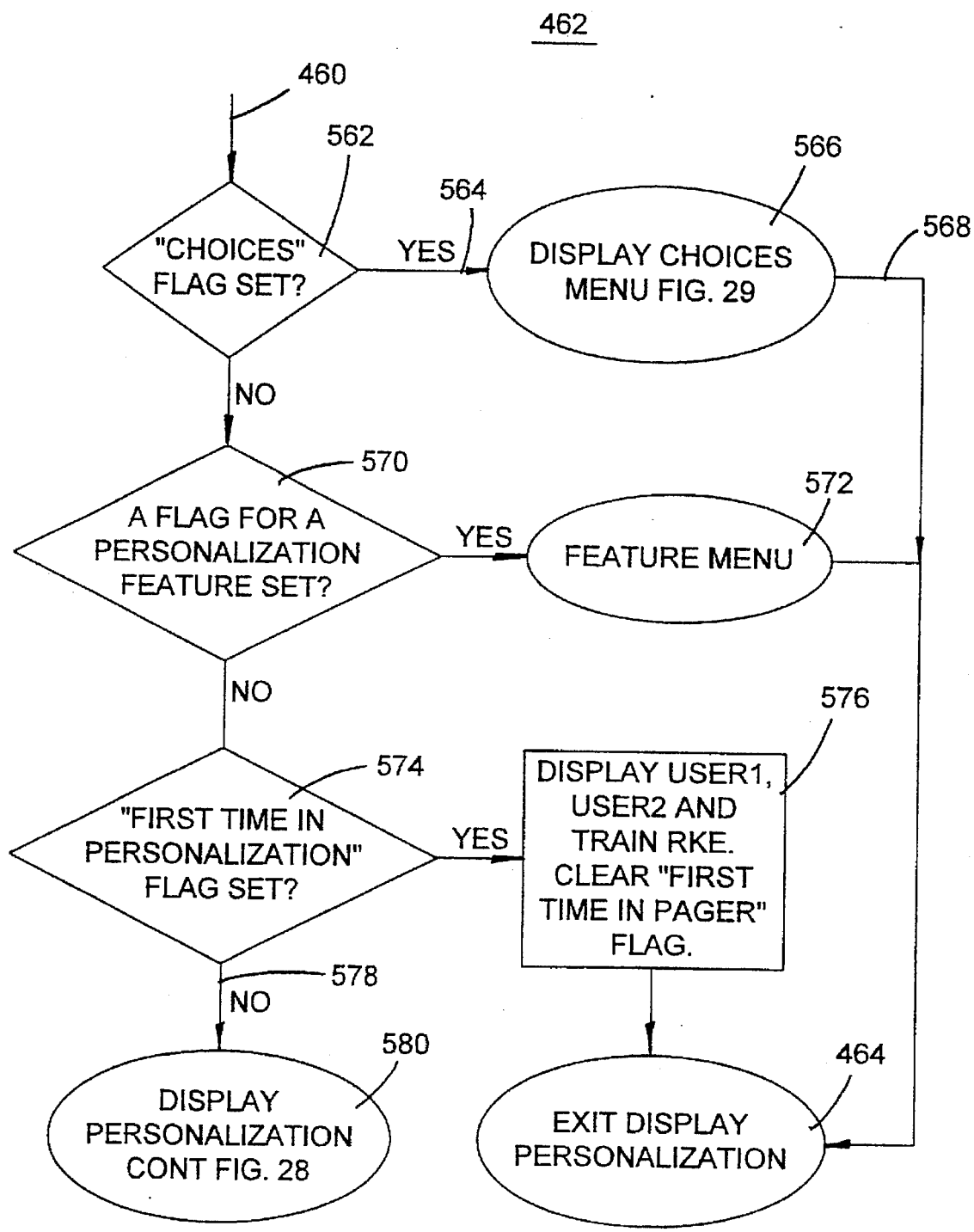

Referring to FIG. 27, the DISPLAY PERSONALIZATION subroutine 462 is shown. This subroutine is entered through input line 460 and begins with block 562 which determines if the "Choices" flag is set. If it is, then the program proceeds through input line 564 to the DISPLAY CHOICES MENU subroutine 566, described in greater detail below in connection with FIG. 29. Upon return from the DISPLAY CHOICES MENU subroutine through output line 568, the program returns to the HIGH-LEVEL DISPLAY subroutine of FIG. 21 via block 464 which is the output line of the DISPLAY PERSONALIZATION subroutine. If block 562 determines that the "Choices" flag is not set, then block 570 determines if a flag for a personalization feature is set. If a flag is set, then the subroutine proceeds to block 572 wherein a "feature menu" enables the vehicle's operator to personalize the vehicle. After block 572, the program returns to the HIGH-LEVEL DISPLAY subroutine of FIG. 21 via block 464. If block 570 determines that a flag for a personalization feature is not set, then block 574 determines if the "First time in Personalization" flag is set. If it is, then block 576 enables the vehicle's operator to decide whether the personalization is for "User1" or "User2", trains the remote keyless entry module to the key fob, and clears the "First time in Pager" flag. The program then returns to the HIGH-LEVEL DISPLAY subroutine of FIG. 21 via block 464. If block 574 determines that the "First time in Personalization" flag is not set, then the program proceeds through input line 578 to the DISPLAY PERSONALIZATION CONT subroutine 580, now described.

Figure 28:
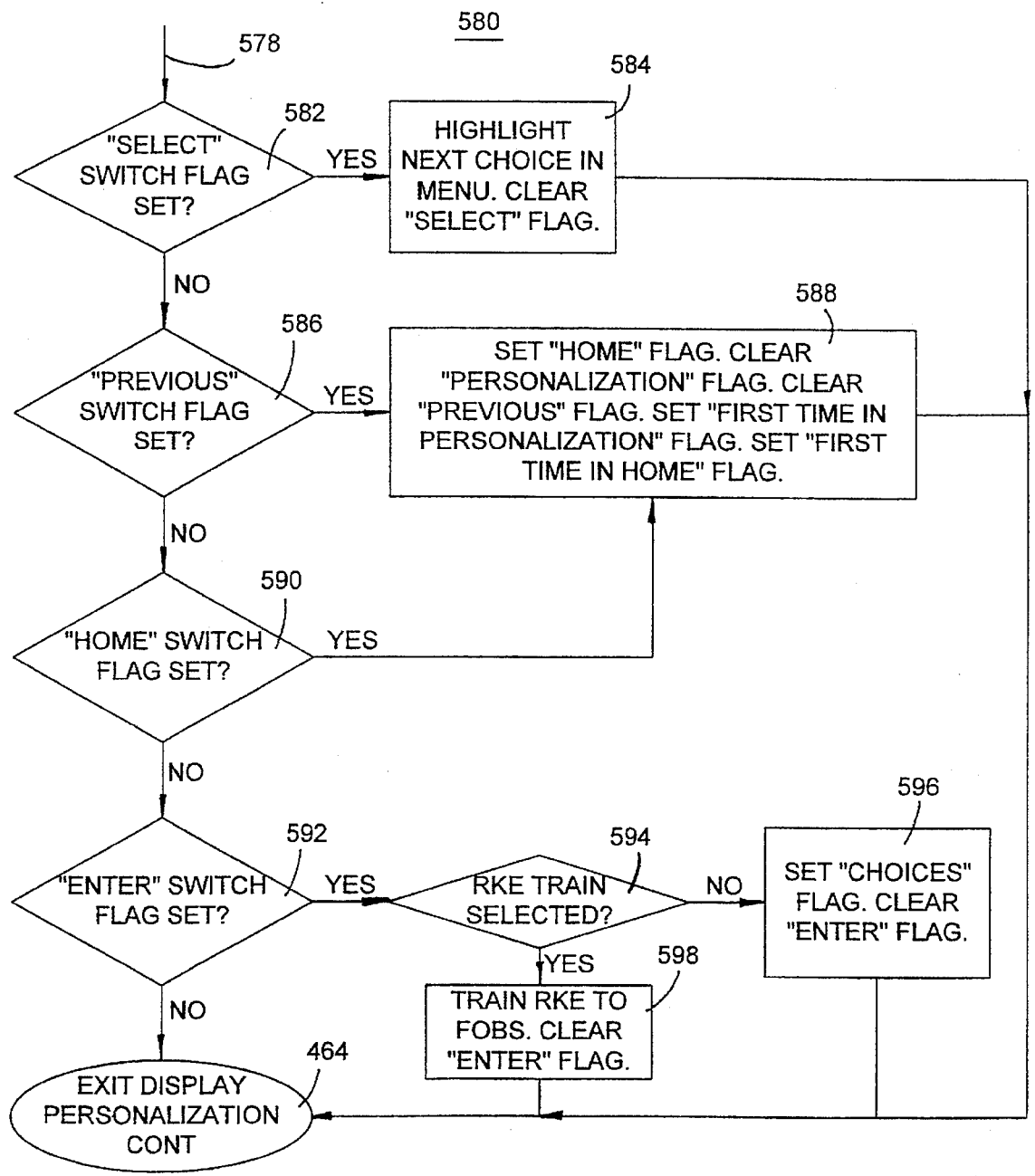

FIG. 28 shows the DISPLAY PERSONALIZATION CONT subroutine 580. This subroutine is entered through input line 578 and begins with block 582 which determines if the "Select" switch flag is set. If it is, then block 584 highlights the next choice in the feature menu and clears the "Select" flag. The program then returns to the HIGH-LEVEL DISPLAY subroutine of FIG. 21 via block 464 which is the output line of the DISPLAY PERSONALIZATION CONT subroutine. If block 582 determines that the "Select" switch flag is not set, then block 586 determines if the "Previous" switch flag is set. If it is, block 588 sets the "Home", "First time in Personalization", and "First time in Home" flags, and clears the "Personalization" and "Previous" flags. The program then returns to the HIGH-LEVEL DISPLAY subroutine of FIG. 21 via block 464. If block 586 determines that the "Previous" switch flag is not set, then block 590 determines if the "Home" switch flag is set. If it is, the program proceeds to block 588 (described above), and returns to the HIGH-LEVEL DISPLAY subroutine of FIG. 21 via block 464. If block 590 determines that the "Home" switch flag is not set, then block 592 determines if the "Enter" switch flag is set. If it is, then block 594 determines if the option to train the remote keyless entry module is selected. If it is, block 598 trains the remote keyless entry module to the key fobs and clears the "Enter" flag. The program then returns to the HIGH-LEVEL DISPLAY subroutine of FIG. 21 via block 464. If block 594 determines that the option to train the remote keyless entry module is not selected, then block 596 sets the "Choices" flag and clears the "Enter" flag. The program then returns to the HIGH-LEVEL DISPLAY subroutine of FIG. 21 via block 464. If block 592 determines that the "Enter" switch flag is not set, then the program returns to FIG. 21 via block 464.

Figure 29:
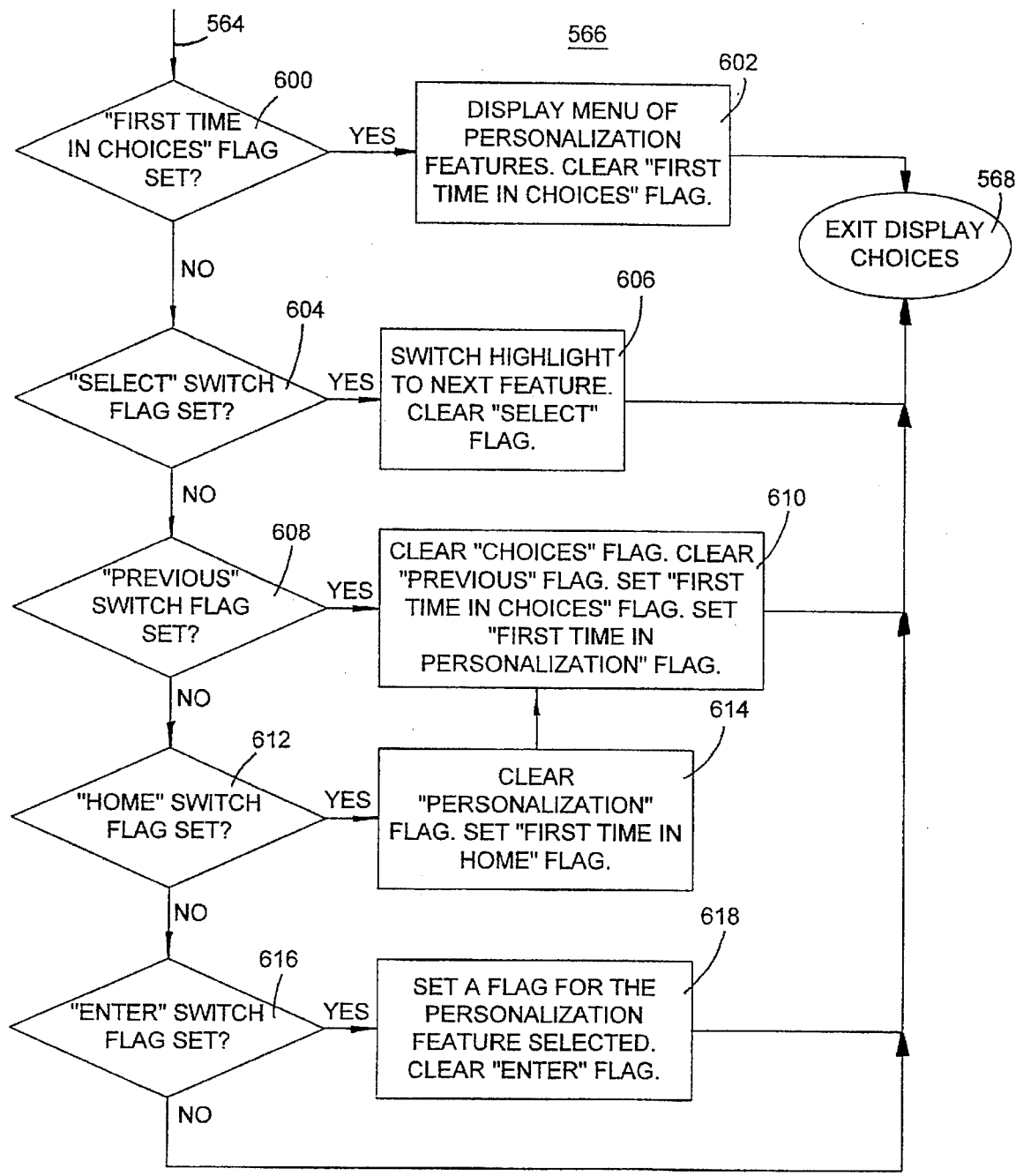

Referring to FIG. 29, the DISPLAY CHOICES subroutine 566 is shown. The subroutine is entered through input line 564 and begins with block 600 which determines if the "First time in Choices" flag is set. If it is, then block 602 displays a menu of personalization features and clears the "First time in Choices" flag. The program then returns to the DISPLAY PERSONALIZATION subroutine of FIG. 27 via block 568 which is the output line of the DISPLAY CHOICES subroutine. If block 600 determines that the "First time in Choices" flag is not set, then block 604 determines if the "Select" switch flag is set. If it is, block 606 switches the highlight in the feature menu to the next feature and clears the "Select" flag. The program then returns to the DISPLAY PERSONALIZATION subroutine of FIG. 27 via block 568. If block 604 determines that the "Select" switch flag is not set, then block 608 determines if the "Previous" switch flag is set. If it is, block 610 clears the "Choices" and Previous" flags and sets the "First time in Choices" and "First time in Personalization" flags. The program then returns to the DISPLAY PERSONALIZATION subroutine of FIG. 27 via block 568. If block 608 determines that the "Previous" switch flag is not set, then block 612 determines if the "Home" switch flag is set. If it is, block 614 clears the "Personalization" flag and sets the "First time in Home" flag. The program then proceeds to block 610 (described above), and returns to the DISPLAY PERSONALIZATION subroutine of FIG. 27 via block 568. If block 612 determines that the "Home" switch flag is not set, then block 616 determines if the "Enter" switch flag is set. If it is, then block 618 sets a flag for the personalization feature selected and clears the "Enter" flag. After block 618, or if block 616 determines that the "Enter" switch flag is not set, the program returns to the DISPLAY PERSONALIZATION subroutine of FIG. 27 via block 568.

Figure 30:
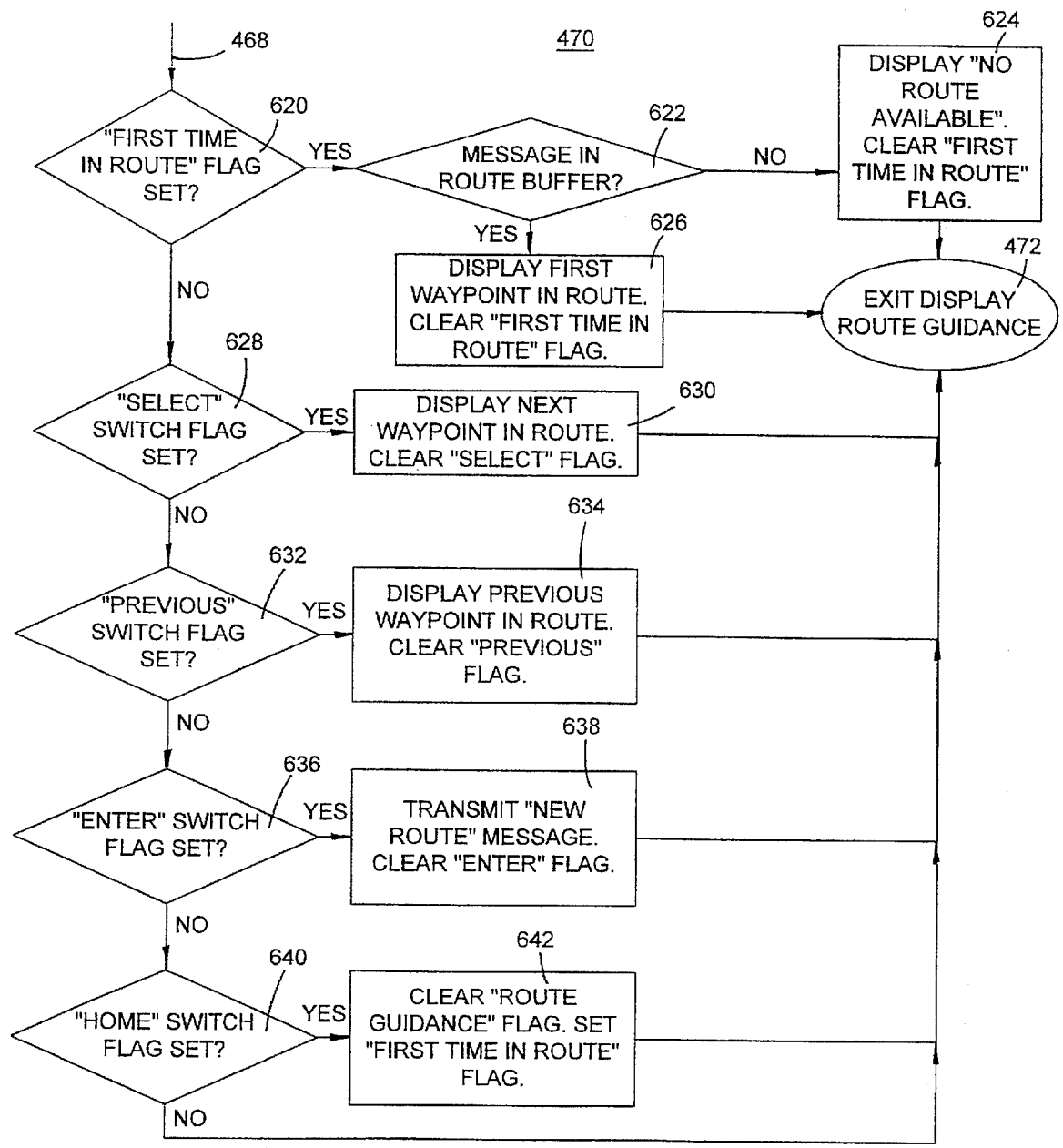

The DISPLAY ROUTE GUIDANCE subroutine 470 is shown in FIG. 30. This subroutine is entered through input line 468 and begins with block 620 which determines if the "First time in Route" flag is set. If it is, block 622 determines if there is a message in the route buffer received by the pager module from a navigation service. If there is no message, block 624 displays a "No Route Available" message on the high-level display and clears the "First time in Route" flag. The program then returns to the HIGH-LEVEL DISPLAY subroutine of FIG. 21 via block 472 which is the output line of the DISPLAY ROUTE GUIDANCE subroutine. If block 622 determines that there is a message in the route buffer, block 626 displays the first waypoint (road or turn) of the route and clears the "First time in Route" flag. The program then returns to the HIGH-LEVEL DISPLAY subroutine of FIG. 21 via block 472. If block 620 determines that the "First time in Route" flag is not set, block 628 determines if the "Select" switch flag is set. If it is, block 630 displays the next waypoint in the route and clears the "Select" flag. The program then returns to the HIGH-LEVEL DISPLAY subroutine of FIG. 21 via block 472. If block 628 determines that the "Select" switch flag is not set, then block 632 determines if the "Previous" switch flag is set. If it is, block 634 displays the previous waypoint in the route and clears the "Previous" flag. The program then returns to the HIGH-LEVEL DISPLAY subroutine of FIG. 21 via block 472. If block 632 determines that the "Previous" switch flag is not set, then block 636 determines if the "Enter" switch flag is set. If it is, the subroutine proceeds to block 638 which causes the two-way pager module to transmit a "New Route" message to the navigation service requesting a new route, and the "Enter" flag is cleared. The program then returns to the HIGH-LEVEL DISPLAY subroutine of FIG. 21 via block 472. If block 636 determines that the "Enter" switch flag is not set, block 640 determines if the "Home" switch flag is set. If it is, block 642 clears the "Route Guidance" flag and sets the "First time in Route" flag. After block 642, or if block 640 determines that the "Home" switch flag is not set, the program returns to the HIGH-LEVEL DISPLAY subroutine of FIG. 21 via block 472.

Figure 31:
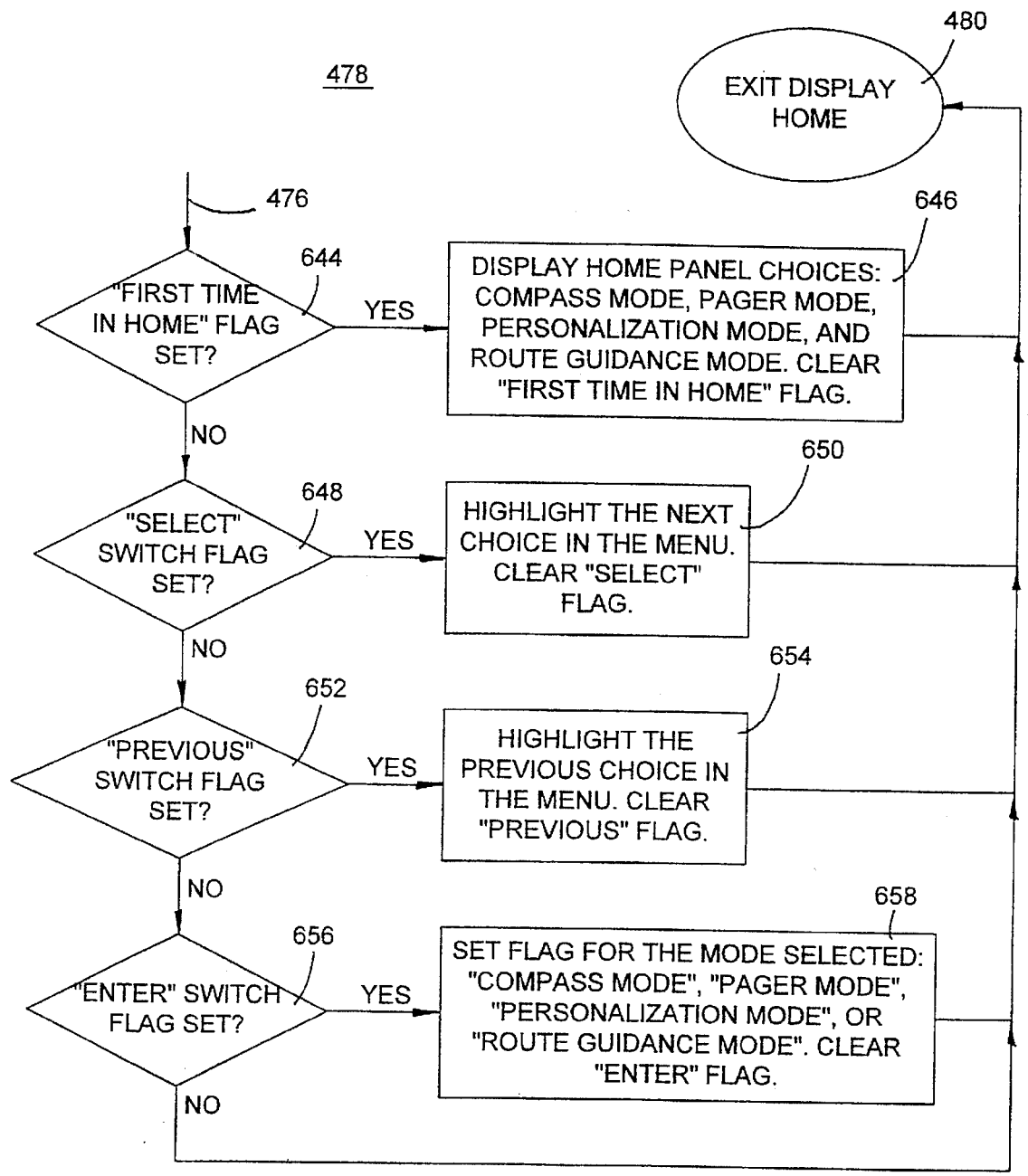

Referring to FIG. 31, the DISPLAY HOME subroutine 478 is shown. This subroutine is entered through input line 476 and begins with block 644 which determines if the "First time in Home" flag is set. If it is, the subroutine proceeds to block 646 which displays the home panel choices consisting of the compass mode, pager mode, personalization mode, and route guidance mode, and clears the "First time in Home" flag. The program then returns to the HIGH-LEVEL DISPLAY subroutine of FIG. 21 via block 480 which is the output line of the DISPLAY HOME subroutine. If block 644 determines that the "First time in Home" flag is not set, block 648 determines if the "Select" switch flag is set. If it is, block 650 highlights the next choice in the feature menu and clears the "Select" flag. The program then returns to the HIGH-LEVEL DISPLAY subroutine of FIG. 21 via block 480. If block 648 determines that the "Select" switch flag is not set, then block 652 determines if the "Previous" switch flag is set. If it is, then block 654 highlights the previous choice in the feature menu and clears the "Previous" flag. The program then returns to the HIGH-LEVEL DISPLAY subroutine of FIG. 21 via block 480. If block 652 determines that the "Previous" switch flag is not set, then block 656 determines if the "Enter" switch flag is set. If it is, then block 658 sets a flag for the particular mode selected and clears the "Enter" flag. After block 658, or if block 656 determines that the "Enter" switch flag is not set, the program returns to the HIGH-LEVEL DISPLAY subroutine of FIG. 21 via block 480.

Figure 32:
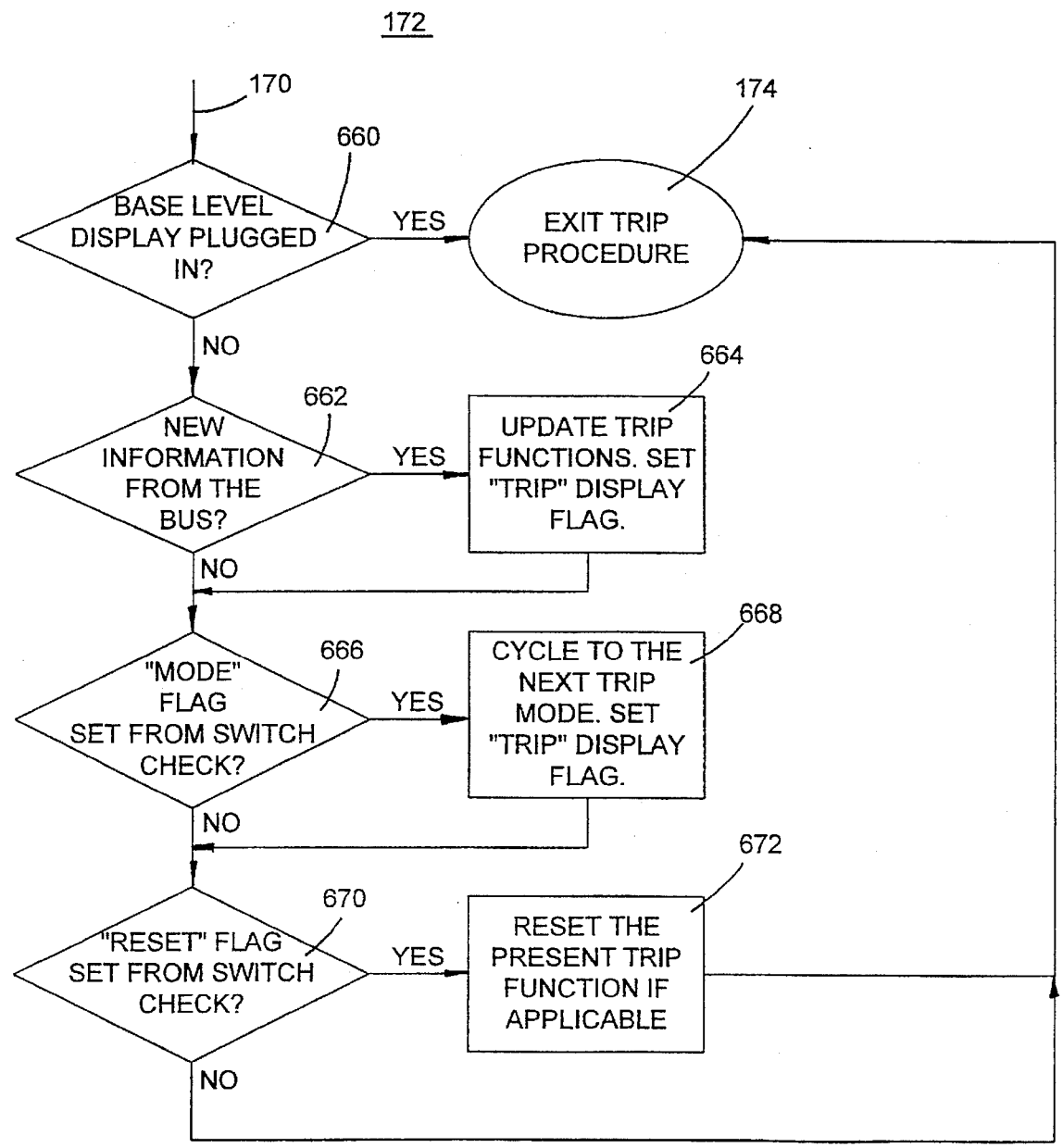

FIG. 32 shows the UPDATE TRIP ROUTINES subroutine 172. This subroutine is entered through input line 170 and begins with block 660 which determines if the base or lower-level display is in use. This routine is not compatible with the base-level display, so, if it is in use, the program returns to the TIMING LOOP subroutine of FIG. 8 via block 174 which is the output line of the UPDATE TRIP ROUTINES subroutine. If block 660 determines that the base level display is not in use, then block 662 determines if new information was received from the bus that is relevant to the trip function, such as the speed of the vehicle. If new information is present, block 664 updates the trip functions accordingly and sets the "Trip" display flag. After block 664, or if block 662 determines that no new information was received by the bus, the program proceeds to block 666 which determines if the "Mode" flag is set due to the execution of the SWITCH CHECK ROUTINE subroutine 192, described in greater detail below in connection with FIG. 35. If it is, block 668 cycles to the next trip mode (range, distance to empty, average speed, instant speed, etc.) and sets the appropriate "Trip" display flag. After block 668, or if block 666 determines that the "Mode" flag is not set, the program proceeds to block 670 which determines if the "Reset" flag is set due to the execution of the SWITCH CHECK ROUTINE subroutine 192. If it is, and if the present trip function has an initialization point, block 672 resets the trip function back to its starting point. After block 672, or if block 670 determines that the "Reset" flag is not set, the program returns to the TIMING LOOP subroutine of FIG. 8 via block 174.

Figure 33:
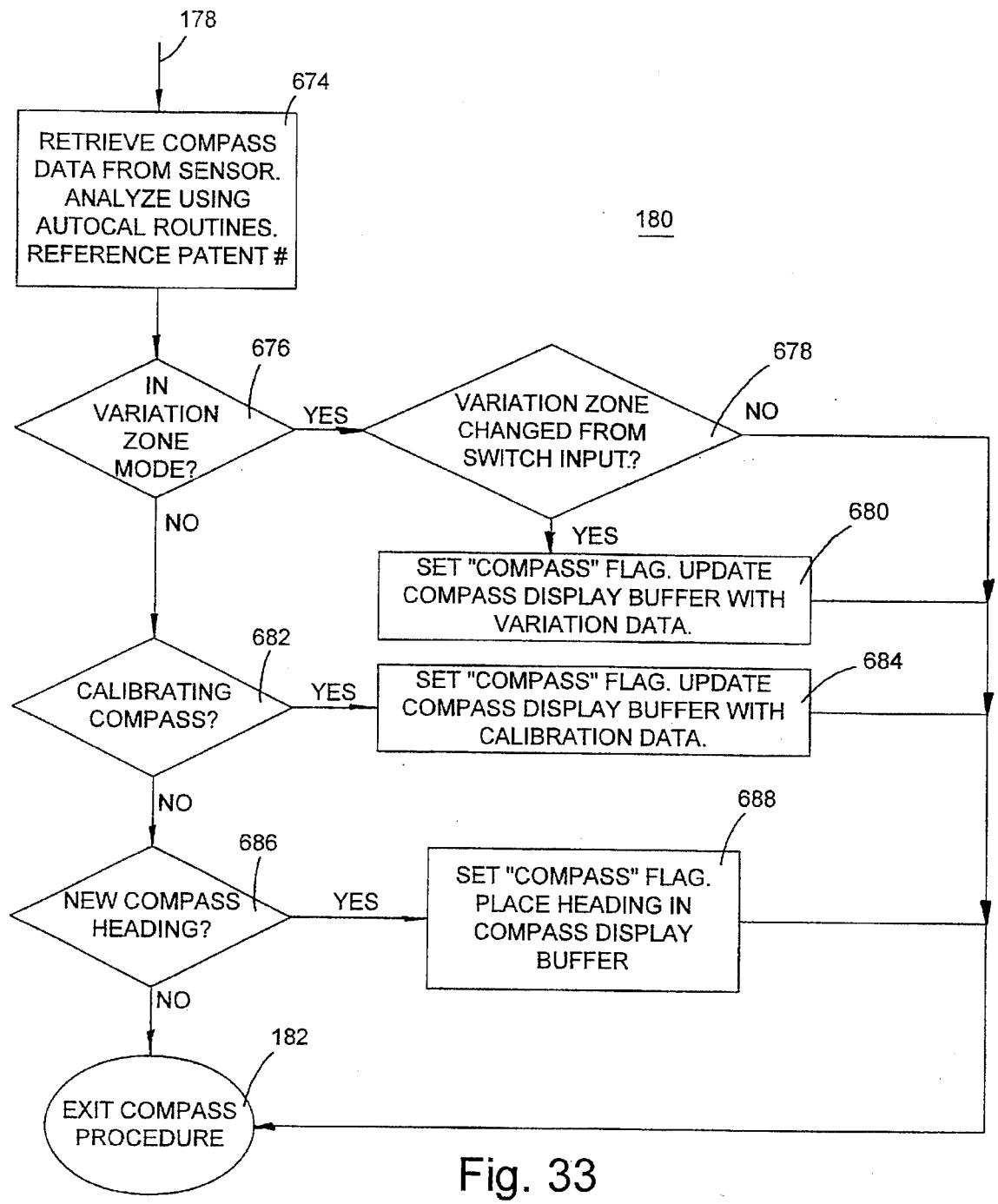

Referring to FIG. 33, the UPDATE COMPASS subroutine 180 is shown. This subroutine is entered through input line 178 and begins with block 674 which retrieves compass data from the compass sensor and examines that information, as disclosed in U.S. Pat. No. 4,953,305, assigned to the present applicant and incorporated herein by reference. Next, block 676 determines if the compass is operating in the variation zone mode and, if it is, block 678 determines if the variation zone was changed by means of the SWITCH CHECK ROUTINE subroutine 192, described in greater detail below in connection with FIG. 35. If it was, block 680 sets the "Compass" flag and updates the compass display buffer with variation data. After block 680, or if block 678 determines that the variation zone was not changed, the program returns to the TIMING LOOP subroutine of FIG. 8 via block 182 which is the output line of the UPDATE COMPASS subroutine. If block 676 determines that the compass is not operating in the variation zone mode, then block 682 determines if the compass data is for calibration purposes. If it is, block 684 sets the "Compass" flag and updates the compass display buffer with the calibration data. The program then returns to the TIMING LOOP subroutine of FIG. 8 via block 182. If block 682 determines that the compass data is not for calibration purposes, then block 686 determines if the data provides a new compass heading. If it does, block 688 sets the "Compass" flag and places the new compass heading in the compass display buffer. The program then returns to the TIMING LOOP subroutine of FIG. 8 via block 182. If block 686 determines that the compass data does not provide a new compass heading, then the program returns to FIG. 8 via block 182.

Figure 34:
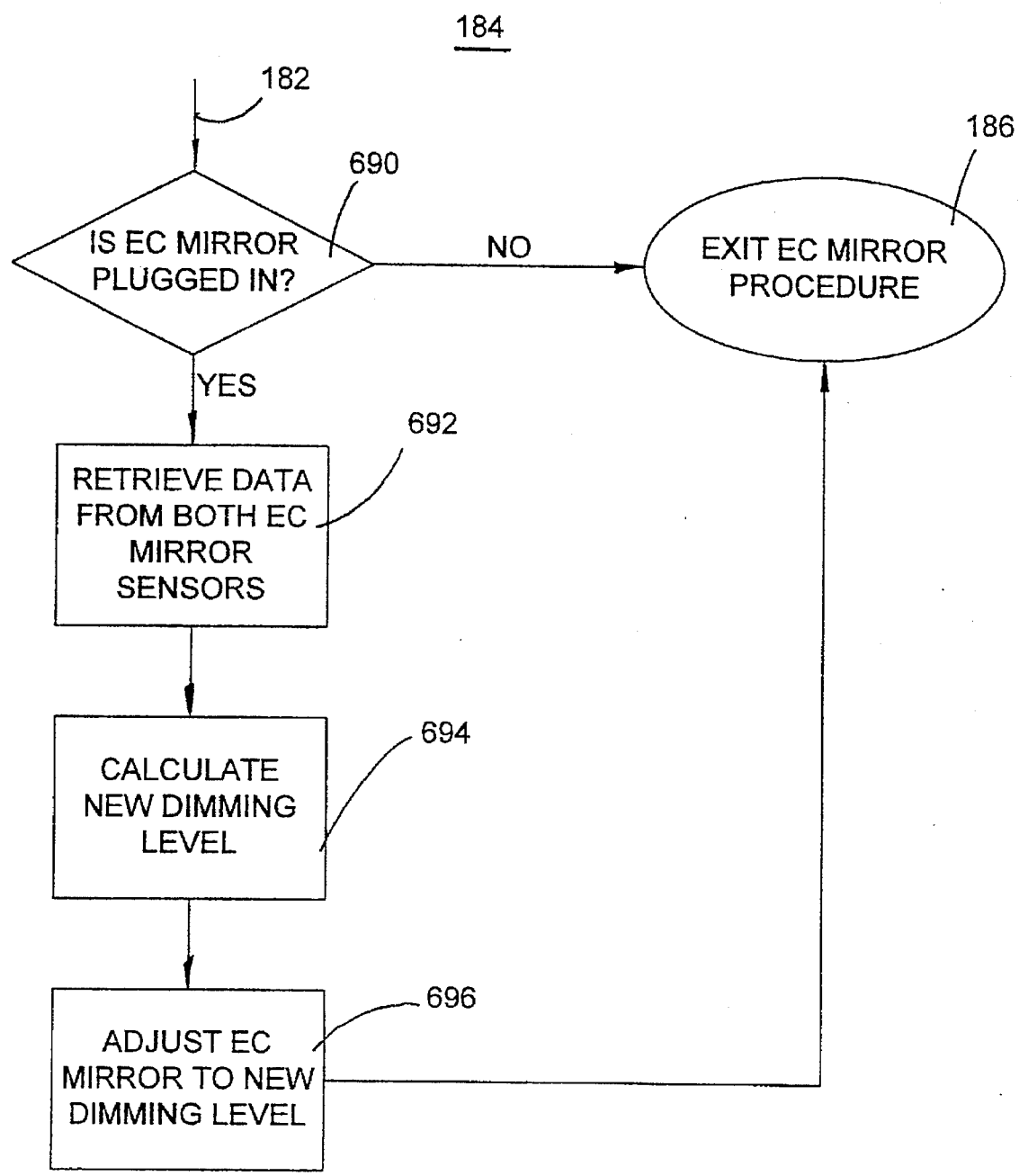

FIG. 34 shows the UPDATE EC MIRROR subroutine 184. This subroutine is entered through input line 182 and begins with block 690 which determines if the electrochromic mirror is installed. If the mirror is not installed, then the program returns to the TIMING LOOP subroutine of FIG. 8 via block 186 which is the output line of the UPDATE EC MIRROR subroutine. If block 690 determines that the mirror is installed, block 692 retrieves data from both of the mirror photocells provided in the electrochromic mirror module. Next, block 694 uses this data to calculate the mirror's new dimming level in a known manner and, in block 696, the mirror is adjusted to this new dimming level. The program then returns to the TIMING LOOP subroutine of FIG. 8 via block 186.

Figure 35:
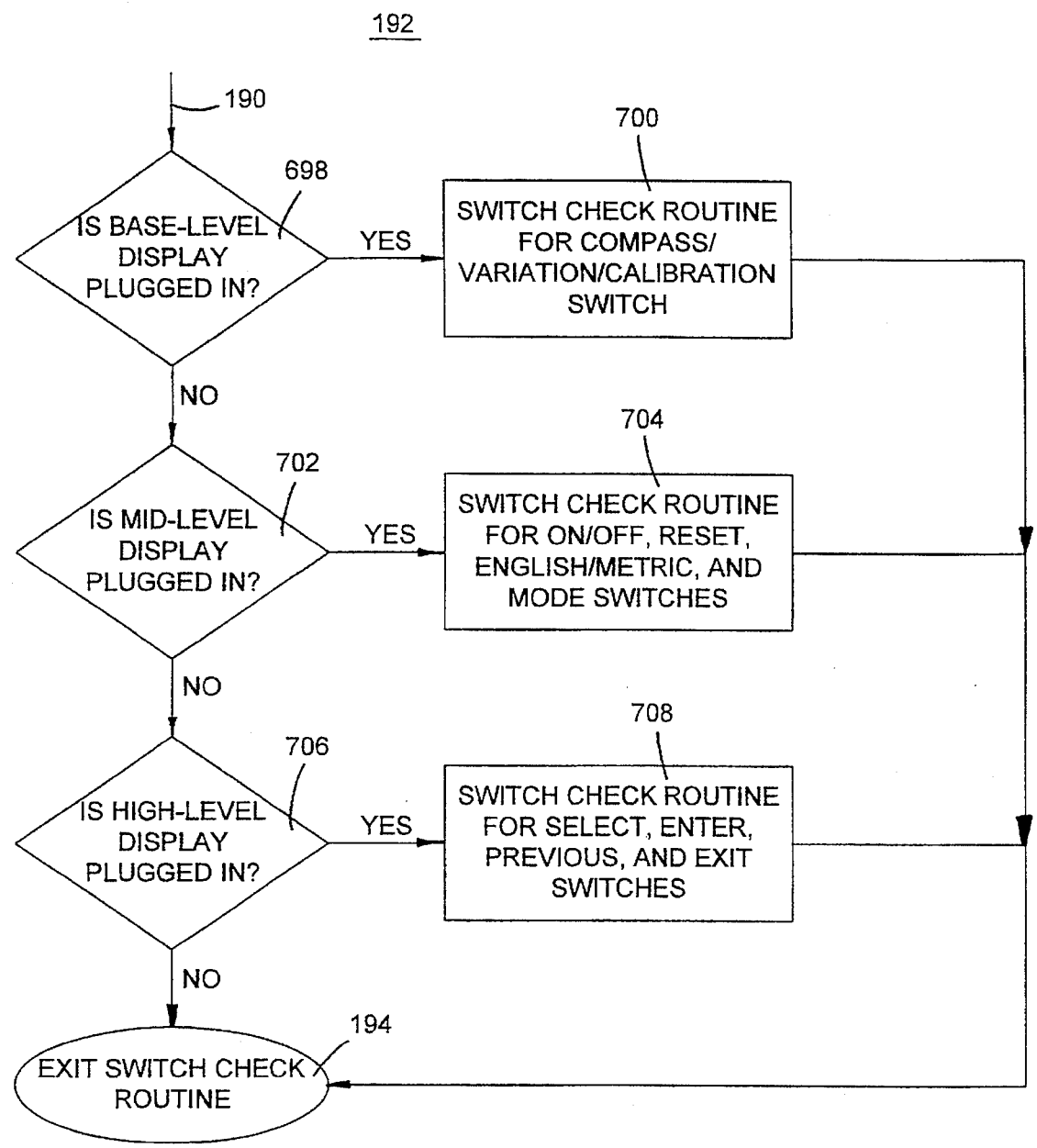

Referring now to FIG. 35, the SWITCH CHECK ROUTINE subroutine 192 is shown. This subroutine is entered through input line 190 and begins with block 698 which determines if the base or lower-level display is in use. If it is, block 700 determines if the compass, variation, or calibration control switches 43 on the exterior of the display have been activated, and, if they are, the appropriate flags are set. The program then returns to the TIMING LOOP subroutine of FIG. 8 via block 194 which is the output line of the SWITCH CHECK ROUTINE subroutine. If block 698 determines that the base-level display is not in use, block 702 determines if the mid-level display is in use. If it is, block 704 determines if the On/Off, Reset, English/Metric, or Mode switches on the exterior of the display have been activated, and, if they are, sets the appropriate flags. The program then returns to the TIMING LOOP subroutine of FIG. 8 via block 194. If block 702 determines that the mid-level display is not in use, block 706 determines if the high-level display is in use. If it is, block 708 determines if the Select, Enter, Previous, or Exit switches on the exterior of the display have been activated, and, if they are, sets the appropriate flags. The program then returns to the TIMING LOOP subroutine of FIG. 8 via block 194. If block 706 determines that the high-level display is not in use, the program returns to FIG. 8 via block 194.

The preferred embodiment of the present invention provides a single mother circuit board 36 having a microprocessor 46 that is capable of interfacing all of the electronic accessory modules and displays with one another and the vehicle's internal electrical system. Although such an arrangement may be preferable for convenience purposes, the use of a single expanded capacity microprocessor may be an unnecessary expense unless all of the accessory modules are to be implemented. As such, an alternative embodiment of the present invention provides three different levels of circuit boards, each having a microprocessor with increasing programming capability for interfacing accessory modules and displays to the vehicle's internal electrical system. Each microprocessor is preferably compatible with one of the three levels of displays (lower, mid, or high) and its associated accessory modules, as described above in connection with the preferred embodiment of the present invention. Thus, when higher levels of accessories are ordered, both an upgraded display and an upgraded circuit board and microprocessor are provided.

The system of the present invention provides a convenient and extremely flexible electrical module mounting system by which a variety of electronic vehicular features can be incorporated in a vehicle during manufacture, by a dealer, or subsequent to purchase. Furthermore, the present invention enables vehicle manufacturers to incorporate a single system within their vehicles which provides the flexibility to accommodate a wide range of consumer preferences.

The above description is considered that of the preferred embodiments only. Modifications of the invention may occur to those skilled in the art but will not depart from the spirit or scope of the invention as defined by the appended claims.

The embodiments of the invention in which an exclusive property or privilege is claimed are defined as follows:

1. A flexible modular electronic display and accessory mounting system for a vehicle comprising:

a plurality of electrical accessory modules each providing information to be displayed to a vehicle operator;

at least one electrical display for displaying information associated with at least one of said accessory modules;

a housing for mounting to a vehicle and including first and second spaced apart mounting areas;

an electrical circuit located within said first mounting area of said housing, said circuit including a microprocessor electrically coupled to the vehicle's electrical system and one of a socket and plug for receiving at least one of said electrical accessory modules, wherein said module includes the other of a plug and socket for electrically coupling said module to said circuit; and wherein said at least one display is located within said second mounting area of said housing and is electrically coupled to said circuit for displaying information associated with said at least one of said plurality of electrical accessory modules.

2. The system as defined in claim 1 wherein said first mounting area of said housing comprises an enclosure having an access cover.

3. The system as defined in claim 1 wherein said at least one display can display information from a plurality of accessory modules.

4. The system as defined in claim 1 wherein said first mounting area of said housing includes a plurality of receptacles for receiving a plurality of said electrical modules.

5. The system as defined in claim 4 wherein said accessory modules and said receptacles are color-coded to assure that a selected module is inserted into an associated receptacle.

6. The system as defined in claim 4 wherein said accessory modules and said receptacles are keyed to assure that a selected module is inserted into an associated receptacle.

7. The electronic accessory system as defined in claim 4 wherein said at least one display includes stop means extending over said receptacles to selectively prevent mounting of at least one predetermined accessory module to said circuit such that only modules associated with said at least one display will mount to said circuit.

8. The system as defined in claim 1 wherein said plurality of electrical accessory modules includes a compass module.

9. The system as defined in claim 8 wherein said plurality of electrical accessory modules further includes a garage door opener module.

10. The system as defined in claim 9 wherein said plurality of electrical accessory modules further includes a remote keyless entry module.

11. The system as defined in claim 10 wherein said plurality of electrical accessory modules further includes a two-way pager module.

12. The system as defined in claim 11 wherein said plurality of electrical accessory modules further includes an electrochromic mirror module.

13. The system as defined in claim 12 wherein said plurality of electrical accessory modules further includes an expansion port module.

14. A modular electronic display and accessory mounting system for a vehicle having an internal electrical system comprising:

a plurality of electrical accessory modules each having a predetermined function;

at least one display board including a display for displaying information associated with at least one of said accessory modules;

a housing for mounting to a vehicle for receiving at least one of said accessory modules;

a circuit board positioned within said housing, said circuit board including a microprocessor electrically coupled to the vehicle's electrical system, wherein said circuit board and at least one electrical accessory module each include connectors for removably electrically coupling said at least one module to said circuit board; and wherein said display is electrically coupled to said at least one circuit board, wherein said microprocessor processes data from said at least one module and provides display signals in response thereto for application to said display.

15. The system as defined in claim 14 wherein said housing comprises an enclosure having an access cover such that said plurality of electrical accessory modules can be contained therein.

16. The system as defined in claim 14 wherein said housing includes a plurality of receptacles for receiving selected ones of said electrical modules.

17. The system as defined in claim 14 wherein said accessory modules and said receptacles include color indicia to identify a selected module and an associated receptacle.

18. The system as defined in claim 14 wherein said accessory modules and said receptacles are geometrically keyed such that a selected module can only be inserted into an associated receptacle.

19. The system as defined in claim 14 wherein said display is compatible with selected ones of said plurality of accessory modules.

20. The electronic accessory system as defined in claim 19 wherein said display includes stop means extending over at least one receptacle to selectively prevent mounting of an accessory module to said circuit board which is incompatible with said display.

21. A modular electronic accessory and display system for a vehicle having an internal electrical system comprising:
a circuit board including a microprocessor electrically coupled to the vehicle's electrical system;
a plurality of electrical accessory modules; and
a plurality of displays for displaying information associated with said accessory modules, wherein when at least one of said electrical accessory modules and at least one of said displays is electrically coupled to said circuit board, said microprocessor electrically couples said at least one accessory module with said at least one display board and the vehicle's electrical system.

22. The system as defined in claim 21 and further including a housing for said circuit board, said housing including receptacles for holding said accessory modules therein.

23. The system as defined in claim 22 wherein said housing includes an access door for enclosing said accessory modules.

24. The system as defined in claim 21 wherein each of said plurality of displays is compatible with selected ones of said plurality of accessory modules.

25. A mounting system for coupling a plurality of electronic accessory modules to a main circuit board comprising:
at least one circuit board including a microprocessor electrically coupled to the vehicle's electrical system, said circuit board including connectors for receiving a plurality of plug-in accessory modules;
a plurality of electrical accessory modules; and
a housing for receiving said circuit board and said accessory modules, wherein said electrical accessory modules and said housing include means to identify which accessory module is associated with its corresponding connector on said circuit board.

26. The system as defined in claim 25 wherein said housing has a floor and said circuit board is mounted on one side of said floor and said modules are mounted on an opposite side of said floor, and wherein said identifying means comprises receptacles formed in said floor for allowing said accessory modules to be plugged into said circuit board.

27. The system as defined in claim 26 wherein said receptacles and accessory modules are color-coded.

28. The system as defined in claim 26 wherein said receptacles and said accessory modules are keyed.

29. A method of mounting a plurality of electrical accessories and displays to a vehicle comprising:
coupling a circuit board including a microprocessor to the vehicle's electrical system;
providing a plurality of electrical accessory modules;
providing a plurality of display boards for displaying information associated with said accessory modules;
coupling at least one of said accessory modules and at least one of said display boards to said circuit board; and
programming said microprocessor to interface said at least one accessory module with said at least one display board and the vehicle's electrical system.

30. The method as defined in claim 29 and further including the step of mounting said circuit board and said accessory modules in a housing.

31. The system as defined in claim 30 wherein said mounting step includes preventing the mounting of an incompatible accessory module with a predetermined display.

32. The method as defined in claim 31 wherein said mounting step comprises keying the housing and accessory modules to one another by one of color or shape.

33. A modular electronic accessory and display system for a vehicle having an internal electrical system comprising:
a circuit board including a microprocessor electrically coupled to the vehicle's electrical system;
a plurality of electrical accessory modules;
a plurality of plug-in displays for displaying information associated with said accessory modules;
a housing including receptacles for receiving said circuit board, said plurality of plug-in displays and said plurality of electrical modules which are compatible with predetermined displays; and
stopper means extending from one of said displays and modules over selected receptacles to prevent the mounting of incompatible displays and accessory modules in said housing, wherein when at least one of said electrical accessory modules and at least one of said displays is electrically coupled to said circuit board, said microprocessor electrically couples said at least one accessory to module with said at least one display board and the vehicle's electrical system.

* * * * *